(12) United States Patent
Ely

(10) Patent No.: US 7,019,672 B2
(45) Date of Patent: Mar. 28, 2006

(54) POSITION SENSOR

(75) Inventor: David T. E. Ely, Harston (GB)

(73) Assignee: Synaptics (UK) Limited, Cambridgeshire (GB)

( * ) Notice: Subject to any disclaimer, the term of this patent is extended or adjusted under 35 U.S.C. 154(b) by 1072 days.

(21) Appl. No.: 09/776,908

(22) Filed: Feb. 6, 2001

(65) Prior Publication Data

US 2001/0006369 A1    Jul. 5, 2001

Related U.S. Application Data

(63) Continuation-in-part of application No. 09/220,354, filed on Dec. 24, 1998, now Pat. No. 6,788,221.

(30) Foreign Application Priority Data

Oct. 20, 1999  (GB) ............................................. 9924846
Jun. 7, 2000   (GB) ............................................. 0013882
Oct. 19, 2000  (WO) ............................... PCT/GB00/04030

(51) Int. Cl.
    *H03M 11/00*    (2006.01)

(52) U.S. Cl. ............................. 341/20; 341/5; 341/111; 340/870.34; 336/124; 336/130; 324/207.17; 178/20.04

(58) Field of Classification Search ................. 341/20, 341/5, 111; 340/870.34; 336/130; 324/207.17; 178/20.04
    See application file for complete search history.

(56) References Cited

U.S. PATENT DOCUMENTS

| | | |
|---|---|---|
| 2,145,742 A | 1/1939 | Wechsung |
| 2,867,783 A | 1/1959 | Childs |
| 2,942,212 A | 6/1960 | Mynall |
| 3,219,956 A | 11/1965 | Newell et al. |
| 3,297,940 A | 1/1967 | Mulligan et al. |

(Continued)

FOREIGN PATENT DOCUMENTS

| | | |
|---|---|---|
| DE | 1134848 | 8/1962 |
| DE | 3500121 A1 | 7/1986 |
| DE | 3620412 A1 | 12/1987 |
| EP | 0159191 A2 | 10/1985 |
| EP | 0182085 A3 | 5/1986 |

(Continued)

OTHER PUBLICATIONS

Patent Abstracts of Japan, vol. 010, No. 009, (P–420), Jan. 14, 1986 & JP 60 165512A (Toshiba KK), Aug. 28, 1985.
Klatt, "Phase of Digital Data Fixes Shaft Angle", Electrical Design News, vol. 16, No. 12, Jun. 15, 1971, pp. 53–56, XP002045871.
Patent Abstracts of Japan, vol. 15, No. 37 (P–1159), Jan. 29, 1991 & JP 02 275314 A (Omron Tateisi Electron Co), Nov. 9, 1990.
Patent Abstracts of Japan, vol. 10, No. 32 (E–379), Feb. 7, 1986 & JP 60 189231 A (Matsushita Denki Sangyo KK, Sep. 26, 1985.

(Continued)

*Primary Examiner*—Albert K. Wong
(74) *Attorney, Agent, or Firm*—Nixon & Vanderhye P.C.

(57) ABSTRACT

A low cost x-y digitising system is described for use in consumer electronic devices, such as portable digital assistants, mobile telephones, web browsers and the like. The digitizer includes a resonant stylus, an excitation winding for energising the resonant stylus and a set of sensor windings for sensing the signal generated by the stylus, from which the x-y position of the stylus is determined. The excitation signals applied to the excitation winding are designed to reduce the power drawn from the power supply which makes the digitising system particularly suited to battery operation.

55 Claims, 25 Drawing Sheets

U.S. PATENT DOCUMENTS

| | | | |
|---|---|---|---|
| 3,482,242 A | 12/1969 | Hargrove | |
| 3,647,963 A | 3/1972 | Bailey | |
| 3,772,587 A | 11/1973 | Ferrand et al. | |
| 3,812,481 A | 5/1974 | Stednitz | |
| 3,851,242 A | 11/1974 | Ellis | |
| 3,895,356 A | 7/1975 | Kraus | |
| 3,898,635 A | 8/1975 | Kulterman | |
| 3,906,436 A | 9/1975 | Kurauchi et al. | |
| 3,962,663 A | 6/1976 | Visser | |
| 4,005,396 A | 1/1977 | Fujiwara et al. | |
| 4,014,015 A | 3/1977 | Gundlach | |
| 4,065,850 A | 1/1978 | Burr et al. | |
| 4,081,603 A | 3/1978 | Davis et al. | |
| 4,092,852 A | 6/1978 | Fowler et al. | |
| 4,094,572 A | 6/1978 | Burr et al. | |
| 4,097,684 A | 6/1978 | Burr | |
| 4,150,352 A | 4/1979 | Pomella et al. | |
| 4,156,192 A | 5/1979 | Schedrovitsky et al. | |
| 4,210,775 A | 7/1980 | Rodgers et al. | |
| 4,223,300 A | 9/1980 | Wiklund | |
| 4,255,617 A | 3/1981 | Carau, Sr. et al. | |
| 4,341,385 A | 7/1982 | Doyle et al. | |
| 4,423,286 A | 12/1983 | Bergeron | |
| 4,425,511 A | 1/1984 | Borsh | |
| 4,482,784 A | 11/1984 | Whetstone | |
| 4,504,832 A | 3/1985 | Conte | |
| 4,507,638 A | 3/1985 | Brosh | |
| 4,532,376 A | 7/1985 | Rockwell | |
| 4,577,057 A | 3/1986 | Blesser | |
| 4,577,058 A | 3/1986 | Collins | |
| 4,593,245 A | 6/1986 | Viertl et al. | |
| 4,609,776 A | 9/1986 | Murakami et al. | |
| 4,642,321 A | 2/1987 | Schoenberg et al. | |
| 4,693,778 A | 9/1987 | Swiggett et al. | |
| 4,697,144 A | 9/1987 | Howbrook | |
| 4,697,244 A | 9/1987 | Murakami et al. | |
| 4,704,501 A | 11/1987 | Taguchi et al. | |
| 4,709,209 A | 11/1987 | Murakami et al. | |
| 4,711,026 A | 12/1987 | Swiggett et al. | |
| 4,711,977 A | 12/1987 | Miyamori et al. | |
| 4,723,446 A | 2/1988 | Saito et al. | |
| 4,734,546 A | 3/1988 | Landmeier | |
| 4,737,698 A | 4/1988 | McMullin et al. | |
| 4,786,765 A | 11/1988 | Yamanami et al. | |
| 4,820,961 A | 4/1989 | McMullin | |
| 4,848,496 A | 7/1989 | Murakami et al. | |
| 4,868,443 A | 9/1989 | Rossi | |
| 4,878,553 A | 11/1989 | Yamanami et al. | |
| 4,891,590 A | 1/1990 | Hammel et al. | |
| 4,893,077 A | 1/1990 | Auchterlonie | |
| 4,902,858 A | 2/1990 | Yamanami et al. | |
| 4,963,703 A | 10/1990 | Phillips | |
| 4,975,546 A | 12/1990 | Craig | |
| 4,985,691 A | 1/1991 | Pulyer et al. | |
| 4,999,461 A | 3/1991 | Murakami et al. | |
| 5,013,047 A | 5/1991 | Schwab | |
| 5,028,745 A | 7/1991 | Yamanami et al. | |
| 5,041,785 A | 8/1991 | Bogaerts et al. | |
| 5,066,833 A | 11/1991 | Zalenski | |
| 5,082,286 A | 1/1992 | Ryan et al. | |
| 5,088,928 A | 2/1992 | Chan | |
| 5,129,654 A | 7/1992 | Bogner | |
| 5,136,125 A | 8/1992 | Russell | |
| 5,177,389 A | 1/1993 | Schalk | |
| 5,188,368 A | 2/1993 | Ryan | |
| 5,381,091 A | 1/1995 | Kobayashi et al. | |
| 5,406,155 A | 4/1995 | Persson | |
| 5,434,372 A | 7/1995 | Lin | |
| 5,486,731 A | 1/1996 | Masaki et al. | |
| 5,557,076 A | 9/1996 | Wieczorek et al. | |
| 5,619,431 A | 4/1997 | Oda | |
| 5,625,239 A | 4/1997 | Persson et al. | |
| 4,878,553 A | 9/1997 | Yamanami et al. | |
| 5,693,993 A | 12/1997 | Ito et al. | |
| 5,748,110 A | 5/1998 | Sekizawa | |
| 5,783,940 A | 7/1998 | Kolomeitsev | |
| 5,815,091 A | 9/1998 | Dames | |
| 5,818,091 A * | 10/1998 | Lee et al. | 257/382 |
| 6,124,708 A | 9/2000 | Dames | |
| 6,249,234 B1 * | 6/2001 | Ely et al. | 341/20 |
| 6,489,899 B1 * | 12/2002 | Ely et al. | 341/20 |
| 6,522,128 B1 * | 2/2003 | Ely et al. | 324/207.17 |
| 6,534,970 B1 * | 3/2003 | Ely et al. | 324/207.17 |
| 6,788,221 B1 * | 9/2004 | Ely et al. | 341/20 |

FOREIGN PATENT DOCUMENTS

| | | |
|---|---|---|
| EP | 0182085 A2 | 5/1986 |
| EP | 0209513 A1 | 6/1986 |
| EP | 0218745 | 4/1987 |
| EP | 0313046 | 4/1989 |
| EP | 0537458 | 4/1993 |
| EP | 0552001 A1 | 7/1993 |
| EP | 0554900 | 8/1993 |
| EP | 0607694 A1 | 7/1994 |
| EP | 0657917 A1 | 6/1995 |
| EP | 0675581 A1 | 10/1995 |
| EP | 0680009 A2 | 11/1995 |
| EP | 0709648 A2 | 5/1996 |
| EP | 0716390 | 6/1996 |
| EP | 0743508 A2 | 11/1996 |
| EP | 0772149 | 5/1997 |
| FR | 1325017 | 3/1962 |
| FR | 2298082 | 8/1976 |
| FR | 2682760 | 4/1993 |
| GB | 851543 | 10/1960 |
| GB | 1122763 | 8/1968 |
| GB | 1452132 | 10/1976 |
| GB | 2012431 A | 7/1979 |
| GB | 2021273 A | 11/1979 |
| GB | 2042183 A | 9/1980 |
| GB | 2059593 A | 4/1981 |
| GB | 2064125 A | 6/1981 |
| GB | 2074736 A | 11/1981 |
| GB | 1604824 | 12/1981 |
| GB | 2103943 A | 3/1983 |
| GB | 2141235 A | 12/1984 |
| TW | 287267 | 1/1996 |
| TW | 347542 | 11/1998 |
| WO | WO 92/12401 | 7/1992 |
| WO | WO 94/25829 | 11/1994 |
| WO | WO 95/31696 | 11/1995 |
| WO | WO 96/03188 A1 | 2/1996 |
| WO | 97/14935 | 4/1997 |
| WO | WO 98/00921 | 1/1998 |
| WO | WO 00/33244 | 6/2000 |

OTHER PUBLICATIONS

McDonnel, "The Use of Inductosyn to Digital Converters in Linear Control Systems", Automation, vol. 10, No. 11–12, Nov. 1975–Dec. 1975, pp. 31–32.

Electronics Letters, vol. 11, No. 1, Jan. 9, 1975, pp. 5–6, Gordon, Digital xy Position Indicator Using Walsh Functions.

Pulle et al, "A New Magnetoresistive Based Sensor for Switched Reluctance Drives" Proceedings of the Annual Power Electronics Specialists Conference (PECS), Toledo, Jun. 29–Jul. 3, 1992, vol. 2, No. CONF, Jun. 23, 29, 1992, pp. 839–843, Institute of Electrical and Electronics Engineers.

* cited by examiner

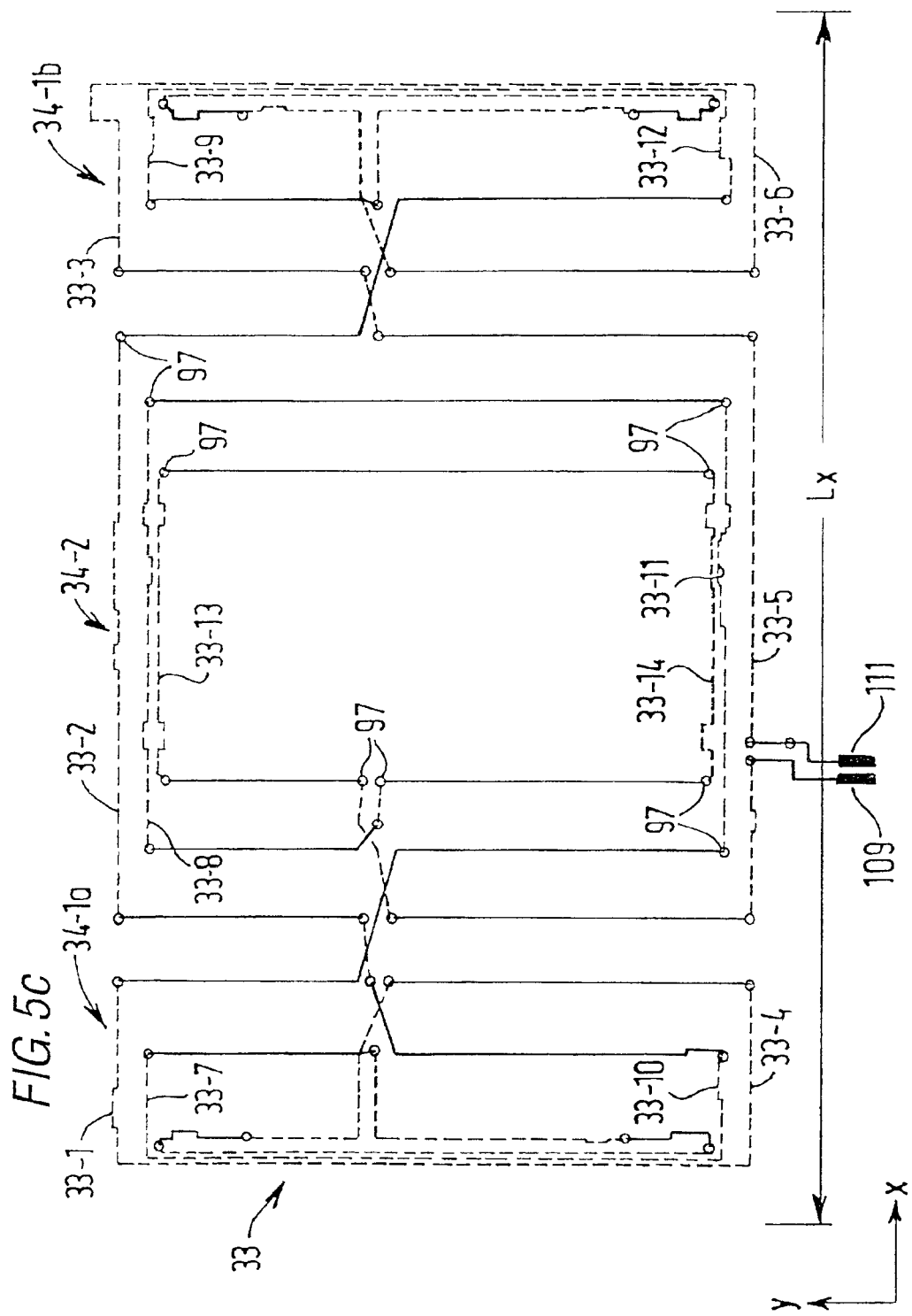

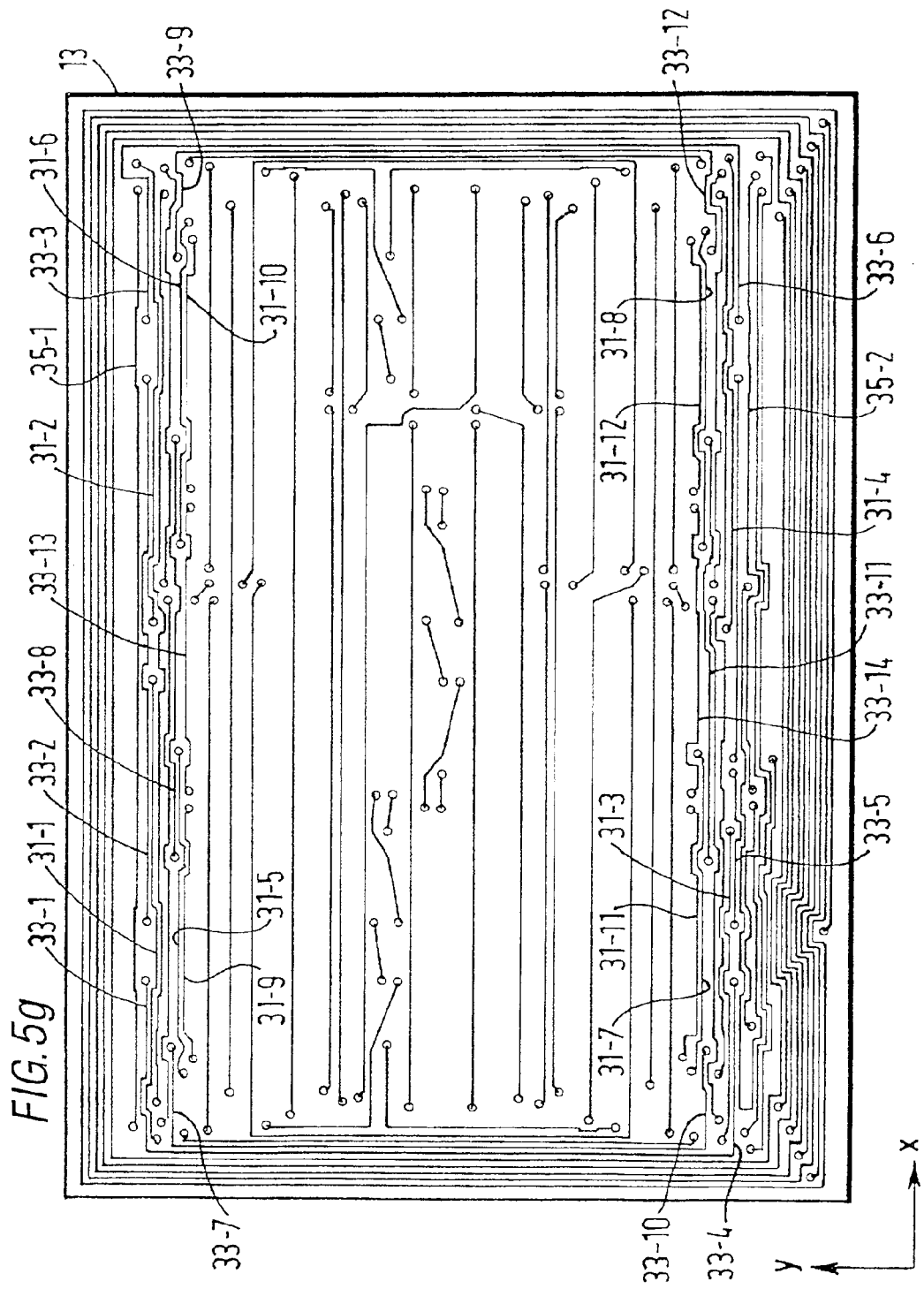

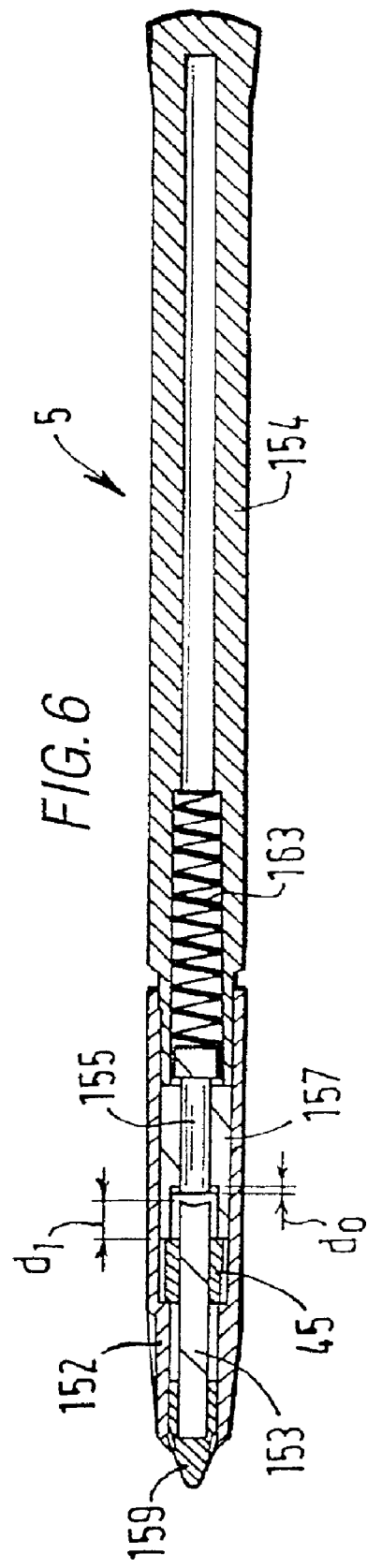

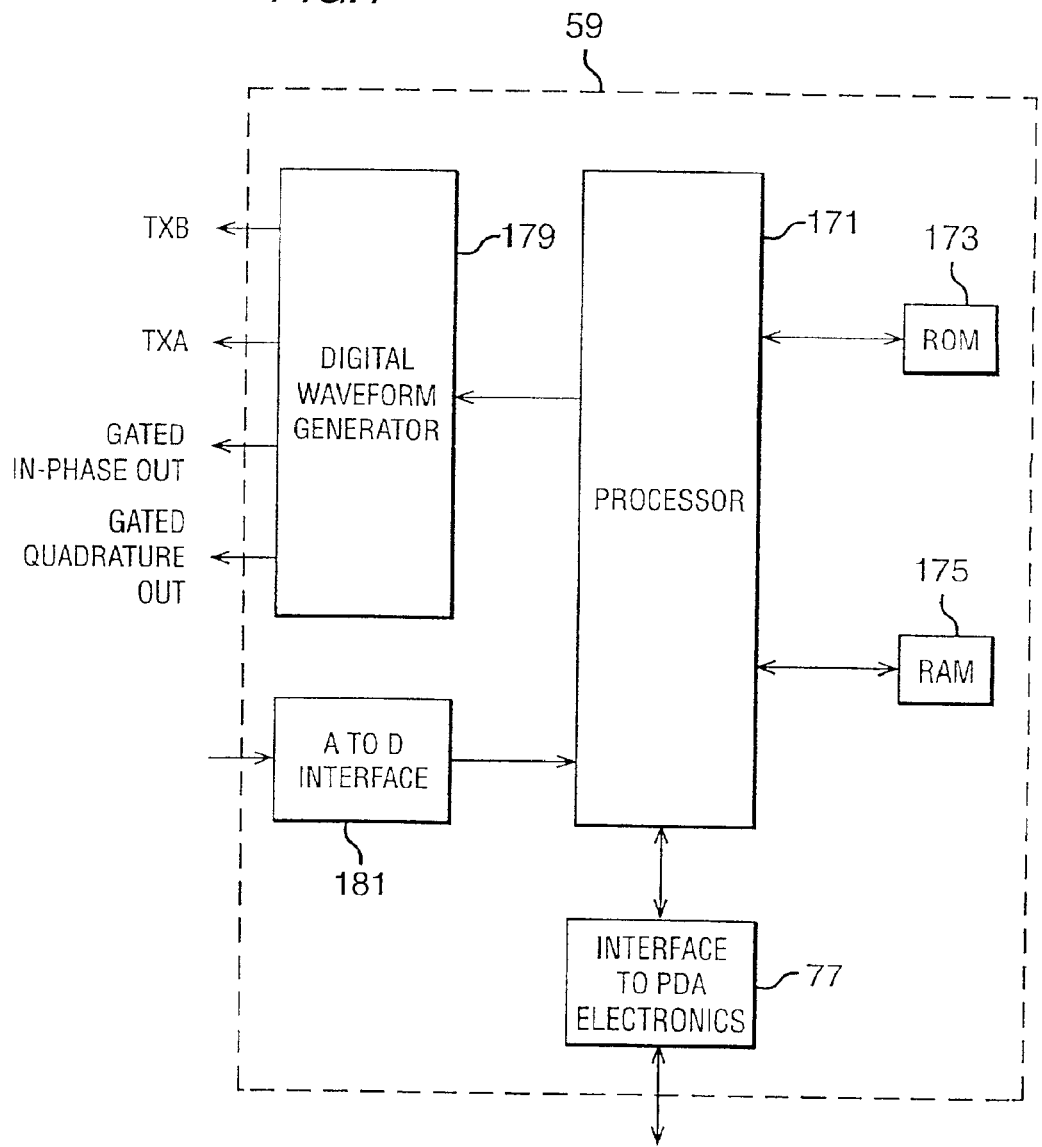

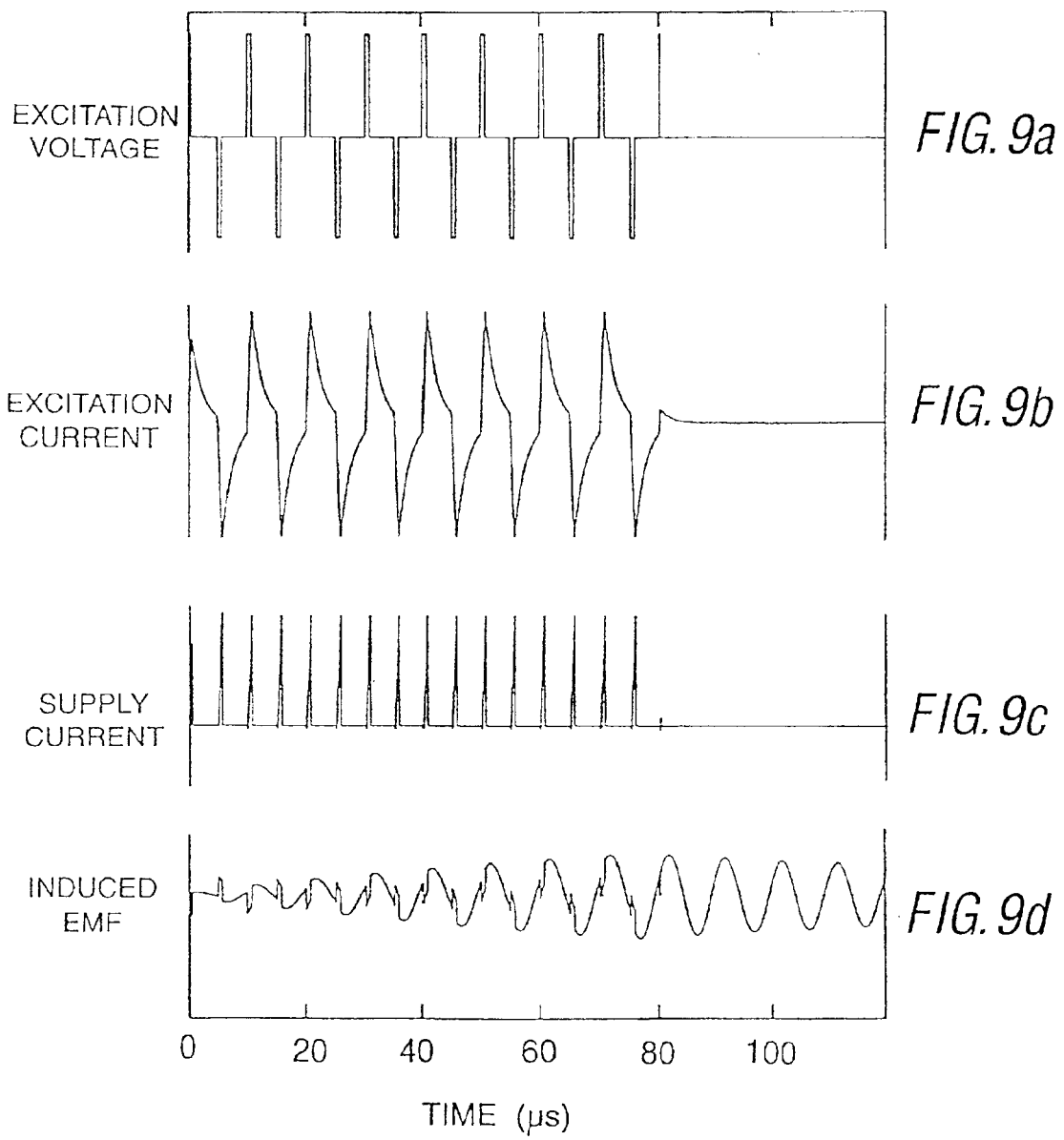

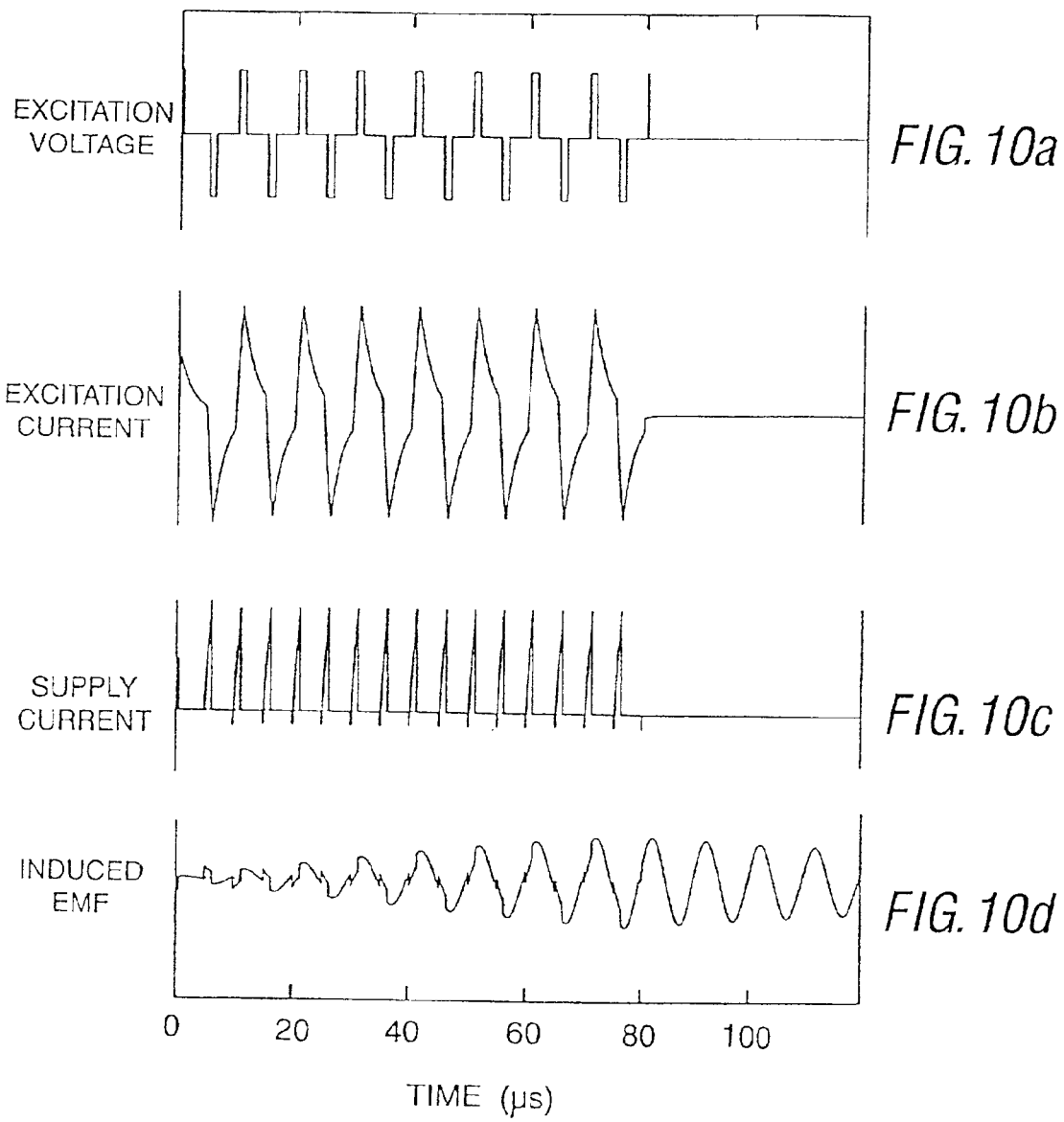

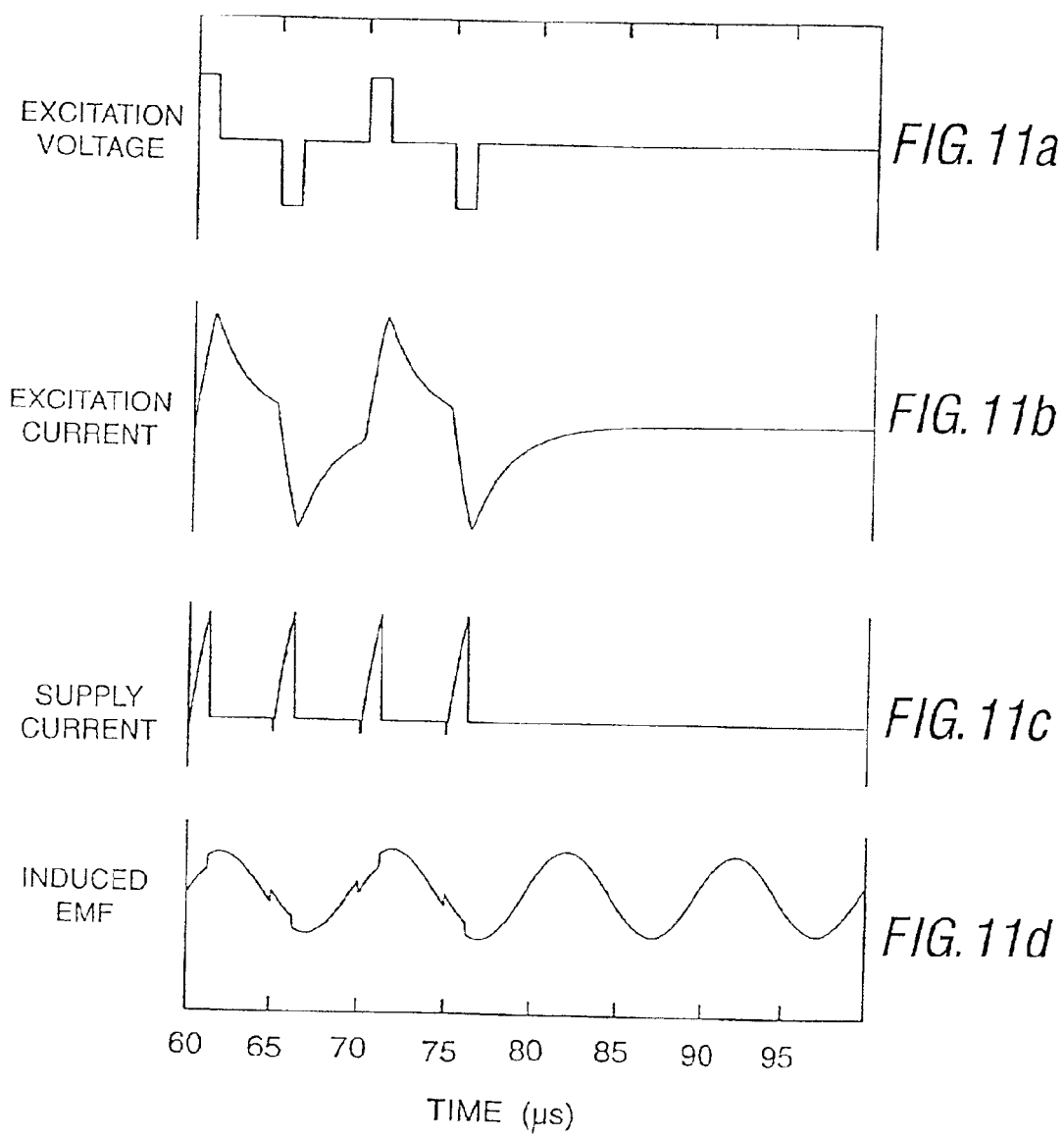

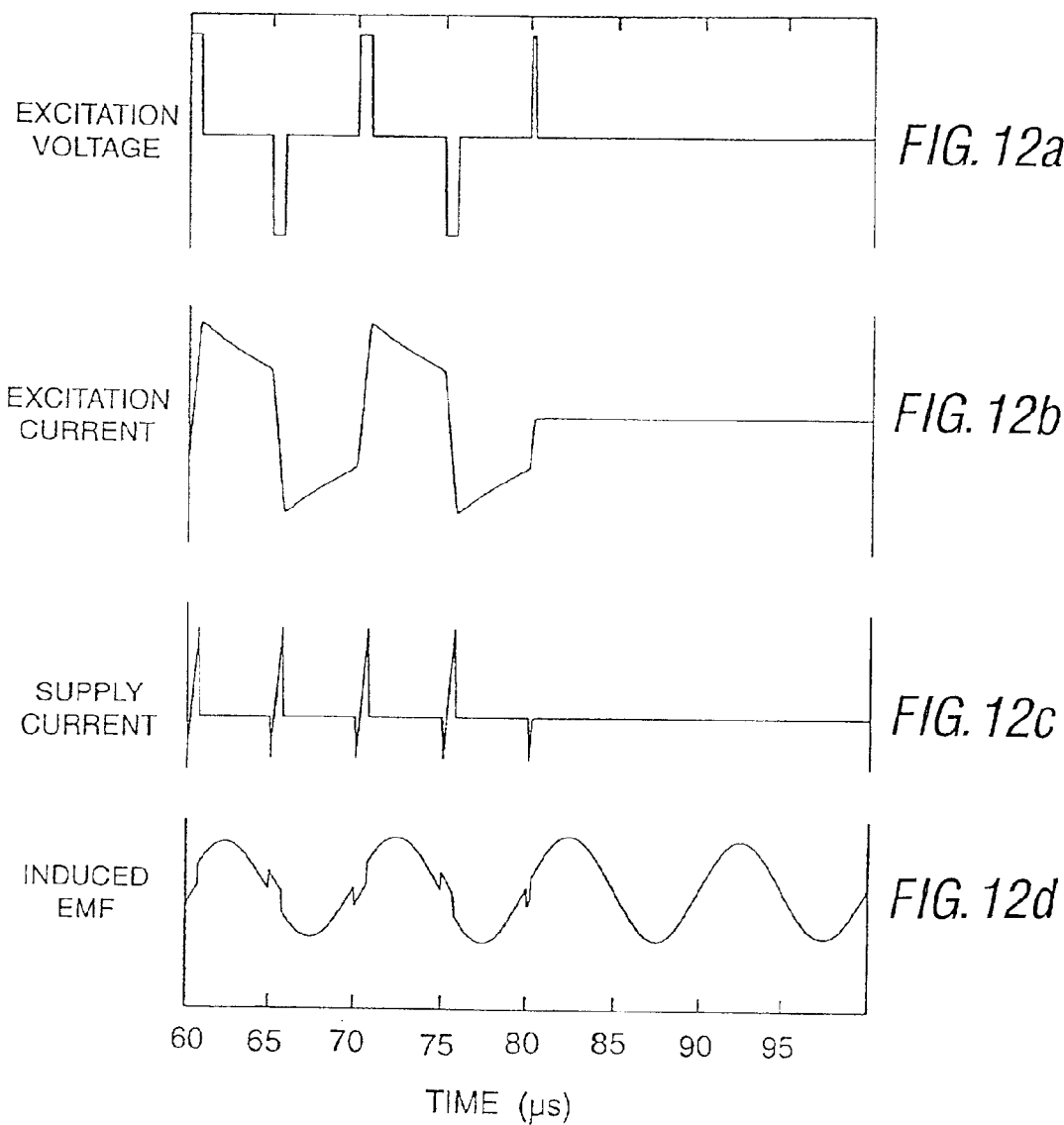

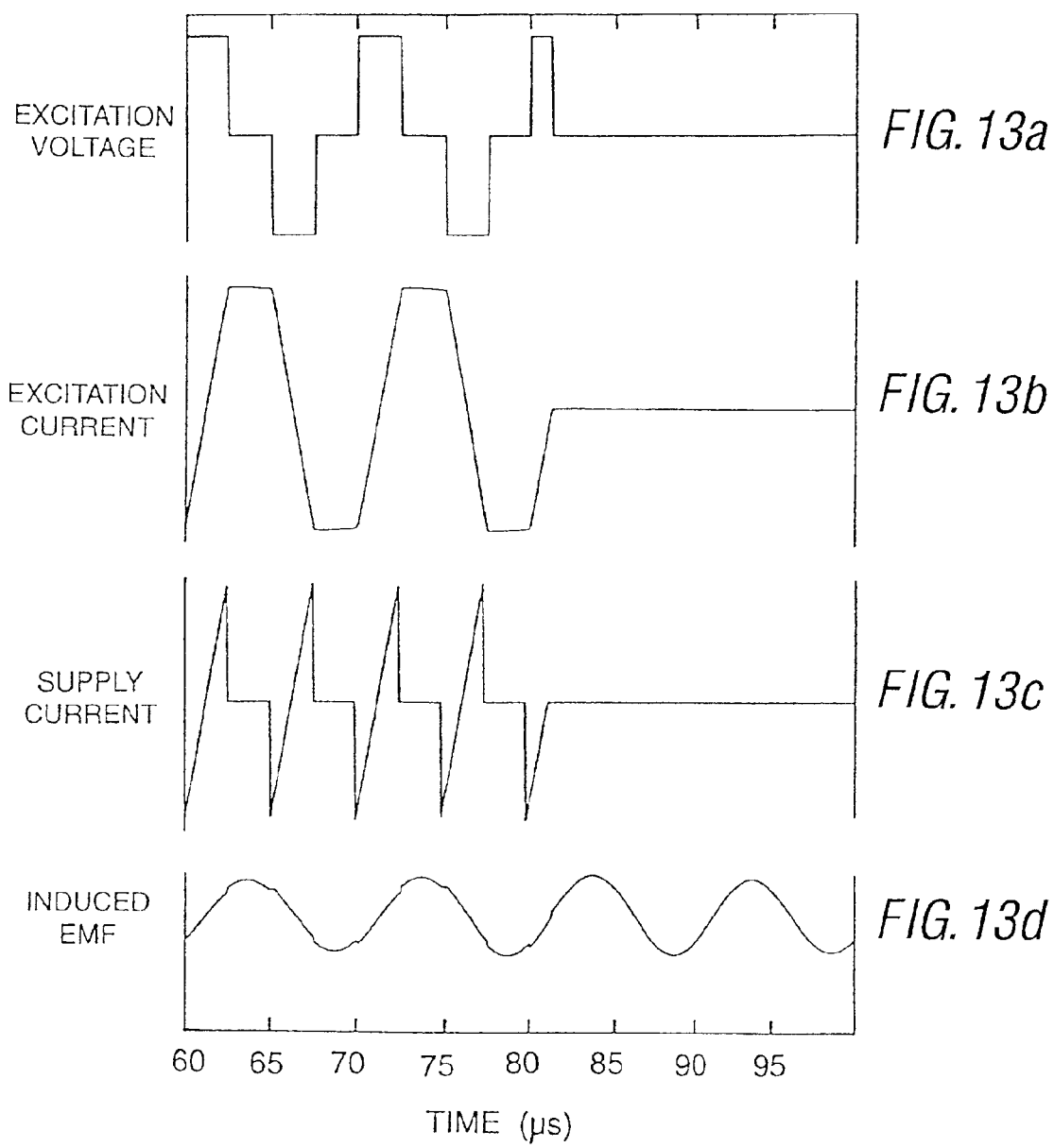

TIME (μs)

POSITION SENSOR

RELATED APPLICATION

This is a continuation-in-part of my commonly assigned application 09/220,354 filed Dec. 24, 1998 now U.S. Pat. No. 6,788,221.

BACKGROUND OF THE INVENTION

1. Field of the Invention

The present invention relates to a position sensor and to parts therefor. The invention has particular although not exclusive relevance to x-y digitising tablets which operate with a cordless stylus. The invention is particularly useful for embedding behind the display of a hand-held electronic device such as a personal digital assistant (PDA), mobile telephone, web browser or products embodying combinations of these.

2. Related Art

U.S. Pat. No. 4,878,533 discloses an x-y digitising tablet which uses a resonant stylus. The digitising tablet comprises a large number of overlapping, but separate, loop coils which are arrayed in the x-y direction. These loop coils are connected through a switching circuit and a multiplexing circuit to an excitation circuit and a receiving circuit. This system is arranged so that the multiplexing circuit connects each of the loop coils in sequence to the switching circuit which firstly connects the connected loop coil to the excitation circuit and then to the receiving circuit. When a loop coil is connected to the excitation circuit, a current is applied to the loop coil which energises the resonant stylus. When the loop coil is connected to the receiving circuit, the receiving circuit detects the electromotive force (EMF) induced in the connected loop coil by the resonant stylus. This system identifies the current position of the stylus by detecting the loop coil which provides the greatest output signal level.

A problem with the digitising tablet described in U.S. Pat. No. 4,878,533 is that it consumes a large amount of power in order to energise and detect the signals in each of the loop coils, which makes it unsuitable for hand-held battery-powered devices such as PDAs and mobile telephones.

BRIEF SUMMARY OF THE INVENTION

An aim of the present invention is to provide components for use in an alternative form of position sensor in which a magnetic field is generated and coupled to a resonant stylus.

According to one aspect of the invention, there is provided a position detector in which a series of excitation pulses is applied across an excitation winding with the duration of the excitation pulses being less than a decay time of a current loop incorporating the excitation winding. The long decay time enables current to flow in the excitation winding for a significant amount of time after each excitation pulse which means that shorter excitation pulses can be used thereby drawing less power from the power supply.

According to another aspect of the invention, there is provided a position detector in which a number of excitation sequences are applied across an excitation winding, each excitation sequence comprising a series of excitation pulses whose durations have been arranged to reduce any slowly-varying components in the excitation sequence. By reducing the slowly-varying components, the power drawn from the power supply is reduced.

BRIEF DESCRIPTION OF THE DRAWINGS

Various features and aspects of the present invention will become apparent from the following description of exemplary embodiments which are described with reference to the accompanying drawings in which:

FIG. 5c illustrates the form of a cos x sensor winding of the digitising system which forms part of the personal digital assistant shown in FIG. 1;

FIG. 5g shows a bottom layer of the printed circuit board which carries the windings shown in FIGS. 5a to 5e;

FIG. 6 is a cross-sectional view of the resonant stylus shown in FIG. 1;

FIG. 7 is a schematic block diagram showing the form of a digital processing and signal generation unit which forms part of the excitation and processing circuitry shown in FIG. 3;

FIG. 9a is a timing diagram illustrating the form of an excitation voltage applied to the excitation winding by the excitation and processing electronics shown in FIG. 3 for a first example;

FIG. 9b is a timing diagram illustrating the form of the excitation current flowing through the excitation winding as a result of the applied excitation voltage shown in FIG. 9a;

FIG. 9c is a timing diagram illustrating the form of the current drawn from the power supply in order to generate the excitation voltage shown in FIG. 9a;

FIG. 9d is a timing diagram illustrating the form of an electromotive force induced in a sensor winding by the resonant stylus when the excitation voltage shown in FIG. 9a is applied to the excitation winding;

FIG. 10a is a timing diagram illustrating the form of an excitation voltage applied to the excitation winding by the excitation and processing electronics shown in FIG. 3 for a third example;

FIG. 10b is a timing diagram illustrating the form of the excitation current flowing through the excitation winding as a result of the applied excitation winding shown in FIG. 10a;

FIG. 10c is a timing diagram illustrating the form of the current drawn from the power supply in order to generate the excitation voltage shown in FIG. 10a;

FIG. 10d is a timing diagram illustrating the form of an electromotive force induced in a sensor winding by the resonant stylus when the excitation voltage shown in FIG. 10a is applied to the excitation winding;

FIG. 11a is a timing diagram illustrating the form of the end of the excitation sequence applied to the excitation winding by the excitation and processing electronics shown in FIG. 3 for a fourth example;

FIG. 11b is a timing diagram illustrating the form of the excitation current flowing through the excitation winding as a result of the applied excitation voltage shown in FIG. 11a;

FIG. 11c is a timing diagram illustrating the form of the current drawn from the power supply in order to generate the excitation voltage shown in FIG. 11a;

FIG. 11d is a timing diagram illustrating the form of an electromotive force induced in a sensor winding by the resonant stylus when the excitation voltage shown in FIG. 11a is applied to the excitation winding;

FIG. 12a is a timing diagram illustrating the end of an excitation voltage sequence applied by the excitation and processing electronics shown in FIG. 3 for a fifth example;

FIG. 12b is a timing diagram illustrating the form of the excitation current flowing through the excitation winding as a result of the applied excitation voltage shown in FIG. 12a;

FIG. 12c is a timing diagram illustrating the form of the current drawn from the power supply in order to generate the excitation voltage shown in FIG. 12a;

FIG. 12d is a timing diagram illustrating the form of an electromotive force induced in a sensor winding by the resonant stylus when the excitation voltage shown in FIG. 12a is applied to the excitation winding;

FIG. 13a is a timing diagram illustrating the form of an excitation voltage sequence applied by the excitation winding of excitation and processing electronics shown in FIG. 3 for a sixth example;

FIG. 13b is a timing diagram illustrating the form of the excitation current flowing the excitation winding as a result of the applied excitation voltage shown in FIG. 13a;

FIG. 13c is a timing diagram illustrating the form of the current drawn from the power supply in order to generate the excitation voltage shown in FIG. 13a;

FIG. 13d is a timing diagram illustrating the form of an electromotive force induced in a sensor winding by the resonant stylus when the excitation voltage shown in FIG. 13a is applied to the excitation winding;

FIG. 14b is a timing diagram illustrating the form of the excitation current flowing through the excitation winding as a result of the applied excitation voltage shown in FIG. 14a;

FIG. 14c is a timing diagram illustrating the form of the current drawn from the power supply in order to generate the excitation voltage shown in FIG. 14a;

FIG. 15b is a timing diagram illustrating the form of the excitation current flowing through the excitation winding as a result of the applied excitation voltage shown in FIG. 15a;

FIG. 15c is a timing diagram illustrating the form of the current drawn from the power supply in order to generate the excitation voltage shown in FIG. 15a;

FIG. 17a is a timing diagram illustrating the form of an excitation voltage sequence applied by the excitation winding of the excitation and processing electronics shown in FIG. 3 in a ninth example;

FIG. 17b is a timing diagram illustrating the form of the excitation current flowing through the excitation winding as a result of the applied excitation voltage shown in FIG. 17a;

FIG. 17c is a timing diagram illustrating the form of the current drawn from the power supply in order to generate the excitation voltage shown in FIG. 17a;

FIG. 17d is a timing diagram illustrating the form of an electromotive force induced in a sensor winding by the resonant stylus when the excitation voltage shown in FIG. 17a is applied to the excitation winding;

FIG. 18a is timing diagram illustrating the form of an excitation voltage sequence applied by the excitation winding of the excitation and processing electronics shown in FIG. 3 in a tenth example;

FIG. 18b is a timing diagram illustrating the form of the excitation current flowing through the excitation winding as a result of the applied excitation voltage shown in FIG. 18a;

FIG. 18c is a timing diagram illustrating the form of the current drawn from the power supply in order to generate the excitation voltage shown in FIG. 18a;

FIG. 18d is a timing diagram illustrating the form of an electromotive force induced in a sensor winding by the resonant stylus when the excitation voltage shown in FIG. 18a is applied to the excitation winding;

FIG. 19a is a timing diagram illustrating the form of an excitation voltage sequence applied by the excitation winding of the excitation and processing electronics shown in FIG. 3 in an eleventh example;

FIG. 19b is timing diagram illustrating the form of the excitation current flowing through the excitation winding as a result of the applied excitation voltage shown in FIG. 19a;

FIG. 19c is a timing diagram illustrating the form of the current drawn from the power supply in order to generate the excitation voltage shown in FIG. 19a;

FIG. 19d is a timing diagram illustrating the form of an electromotive force induced in a sensor winding by the resonant stylus when the excitation voltage shown in FIG. 19a is applied to the excitation winding.

DETAILED DESCRIPTION OF EXEMPLARY EMBODIMENTS

Overview of Digitising System

Figure 1:
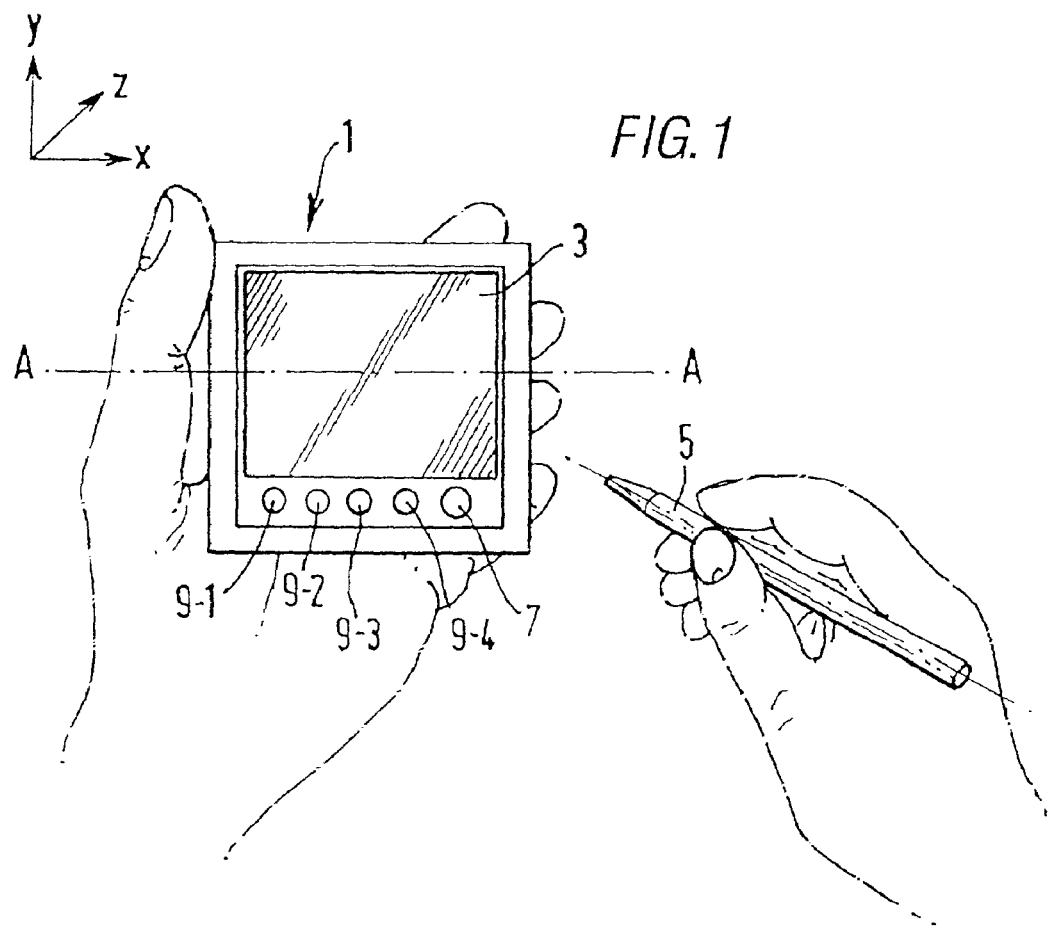
FIG. 1 is a schematic view of a hand-held personal digital assistant (PDA) which includes an x-y digitising system located behind the PDA's liquid crystal display which can sense the (x,y) position of a resonant stylus.

FIG. 1 shows a hand-held personal digital assistant (PDA) 1 which employs an x-y digitising system (not shown) which is located beneath a liquid crystal display 3 of the PDA 1. The x-y digitising system is operable to detect the presence and x-y position of a resonant stylus 5 relative to the LCD 3. The position signals output from the digitising system are used by the PDA 1 to control information that is displayed on the LCD 3 and to control the operating function of the PDA 1. As shown, the PDA 1 also includes a number of push buttons beneath the LCD 3 including an on-off button 7 and a number of control buttons 9-1 to 9-4 which are used to control different functions of the PDA 1.

Figure 2:
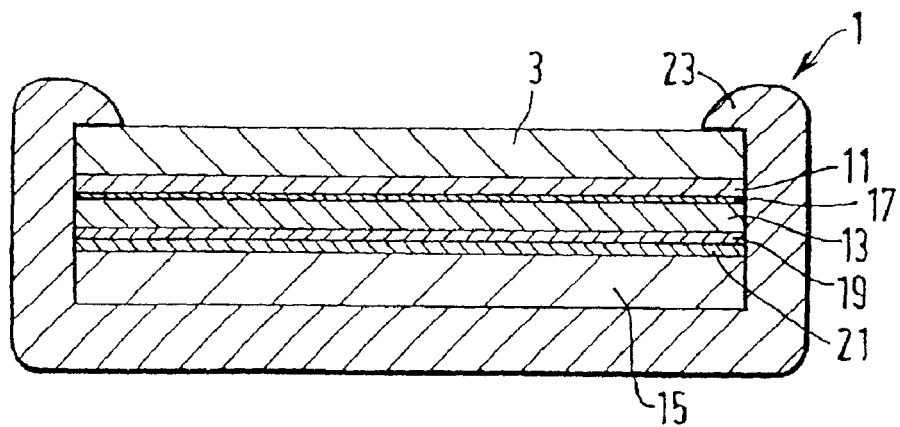
FIG. 2 schematically illustrates a cross-sectional view of the personal digital assistant shown in FIG. 1, illustrating the positional relationship between a sensor printed circuit board of the digitising system and the liquid crystal display.

FIG. 2 shows a cross-sectional view on A—A of the PDA 1 shown in FIG. 1. As shown, the PDA 1 includes a liquid crystal display 3 which, in this embodiment, is between 1.5 mm and 3 mm thick. Beneath the LCD 3, there is an electroluminescent backlight 11 for providing a backlight for the LCD 3. In this embodiment, this backlight layer 11 has a thickness of approximately 150 μm. Beneath these layers, there is a 0.2 mm thick sensor printed circuit board (PCB) 13 which forms part of the above-mentioned x-y digitising system. This sensor PCB 13 carries the excitation winding and the sensor windings used for sending signals to and receiving signals from the resonant stylus 5. Beneath the sensor PCB 13 there is a printed circuit board 15 which carries the electronics for controlling the functions of the PDA and the digitiser electronics for processing the signals received from and controlling the signals sent to the windings on the sensor PCB 13.

As shown in FIG. 2, in this embodiment, a grounded electrostatic screen 17 is provided between the sensor printed circuit board 13 and the electroluminescent backlight 11 in order to reduce noise from the liquid crystal display 3 and the backlight 11 from interfering with the x-y digitising system. In this embodiment, this electrostatic screen is formed from a continuous layer of carbon ink which is approximately 10 μm thick and has a relatively high surface resistivity (e.g. >1 ohm per square) so that it does not interfere with the magnetic sensing function. Further, as shown in FIG. 2, beneath the sensor PCB 13 is a 50 μm layer of pressure sensitive adhesive 19 for bonding the sensor PCB 13 onto a magnetic screen 21, which in this embodiment is a 25 μm layer of spin melt ribbon (for example Vitrovac 6025 manufactured by Vacuumschmelze, Hanau, Germany). As those skilled in the art will appreciate, the magnetic screen 21 is provided in order to reduce any disturbance which may be caused to the x-y digitising system by, for example, the electronics behind the sensor PCB 13. It also enhances the sensitivity of the x-y digitising system since it provides a permeable path for magnetic flux to pass behind the sensor windings on the sensor PCB 13. As shown in FIG. 2, encasing these layers and providing mechanical support is an outer casing 23 which is made, in this embodiment, from plastic.

Figure 3:
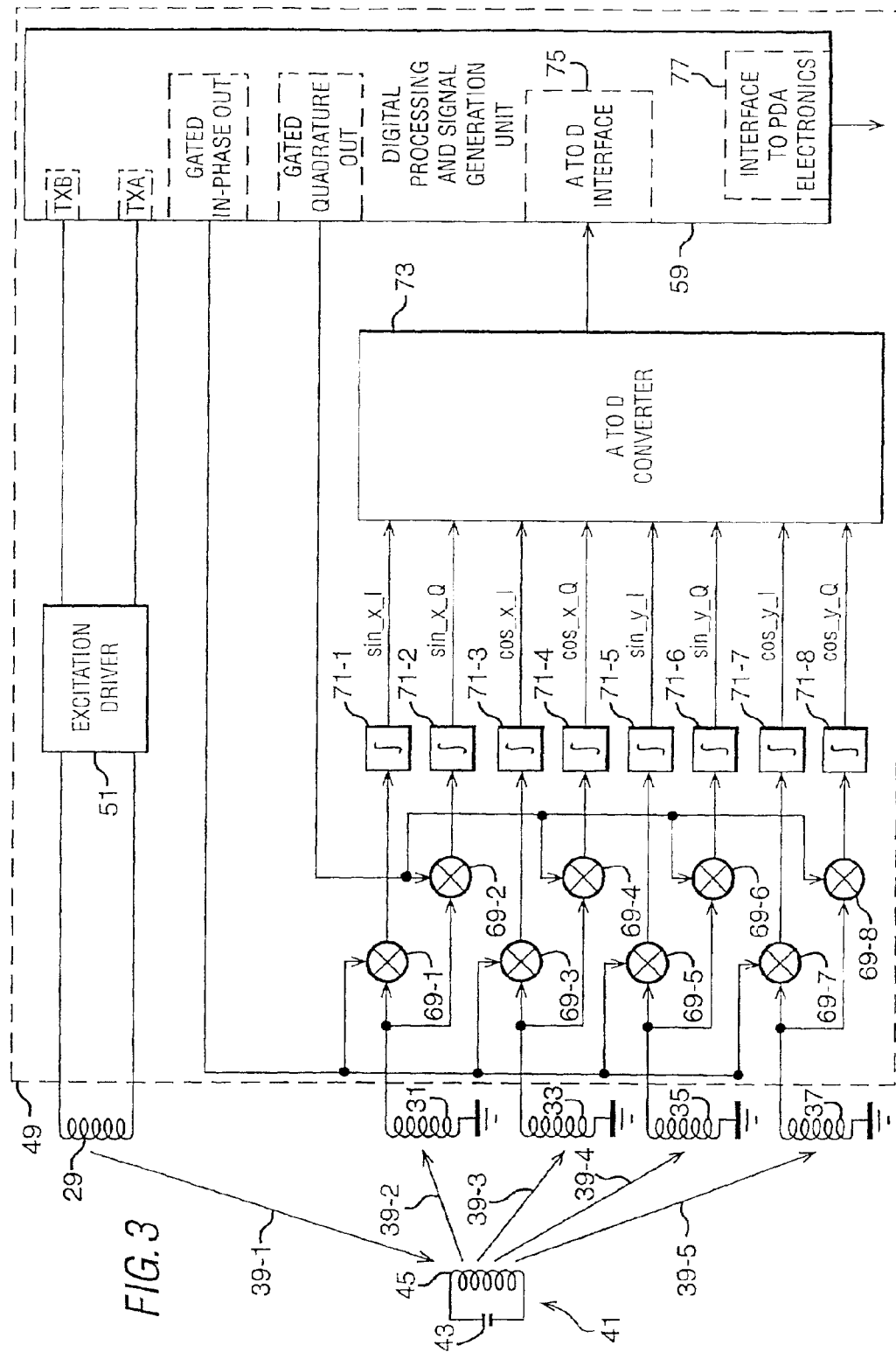
FIG. 3 is a schematic functional block diagram illustrating the excitation and processing electronics of the x-y digitising system and illustrating the magnetic coupling between an excitation winding of the digitising system and the resonant stylus and the magnetic coupling between the resonant stylus and four sensor windings which form part of the digitising system.

FIG. 3 schematically illustrates a functional block diagram of the digitising system which forms part of the PDA shown in FIG. 1. FIG. 3 also illustrates the way in which the excitation winding and the sensor windings interact with the resonant stylus 5. In particular, FIG. 3 schematically shows an excitation winding 29, two x-sensor windings 31 and 33 for sensing x position and two y-sensor windings 35 and 37 for sensing y position. Each of these windings is formed by printed conductors on the sensor PCB 13. As will be explained in more detail below, the sensor windings 31, 33, 35 and 37 are periodic and are in spatial phase quadrature relative to each other. Therefore, in the following description x-sensor winding 31 will be referred to as the sin x sensor winding, x-sensor winding 33 will be referred to as the cos x sensor winding, y-sensor winding 35 will be referred to as the sin y sensor winding and y-sensor winding 37 will be referred to as the cos y sensor winding. As illustrated by the arrows 39, these windings are operable, in use, to couple magnetically with a resonant circuit 41 (comprising a capacitor 43 and an inductor coil 45) in the resonant stylus 5.

The excitation winding and the sensor windings are connected to digitiser electronics 49 (indicated by the dashed block in FIG. 3) which generates an excitation signal which passes through the excitation winding 29 and determines an x-y position of the resonant stylus 5 from signals received from the sensor windings. The digitiser electronics 49 includes a digital processing and signal generation unit 59 which, in operation, generates control signals TXA and TXB for controlling an excitation driver 51 which applies an excitation voltage across the ends of the excitation winding 29. In this embodiment, the excitation voltage applied across the ends of the excitation winding 29 comprises a sequence of positive and negative pulses having a fundamental frequency component ($F_0$) of approximately 100 kHz, which is matched to the resonant frequency of the resonant circuit 41. Various alternative excitation sequences will be described in more detail hereinafter.

The excitation current flowing in the excitation winding 29 generates a corresponding electromagnetic field which magnetically couples, as indicated by the arrow 39-1, with the resonant circuit 41 and causes it to resonate. In this embodiment, the excitation winding 29 is arranged to keep the magnetic coupling between it and the resonator as constant as possible with the x-y position of the stylus relative to the LCD 3. When the resonator 41 is resonating, it generates its own electromagnetic field which magnetically couples, as represented by the arrows 39-2, 39-3, 39-4 and 39-5, with the sensor windings 31, 33, 35 and 37 respectively. As will be explained in more detail below, the sensor windings 31, 33, 35 and 37 are designed so that the coupling between them and the resonant stylus varies with the x or y position of the stylus and so that there is minimum direct coupling between them and the excitation winding 29. Therefore, the signal received in the sensor windings should only vary with the magnetic coupling between the resonator 41 and the respective sensor winding. Consequently, by suitable processing of the signals received in the sensor windings, the x-y position of the resonator 41, and hence of the resonant stylus 5, can be determined relative to the sensor windings.

In this embodiment, in order to reduce the effect of any breakthrough from the excitation winding 29 to the sensor windings on the x-y position measurement, the excitation current is not continuously applied to the excitation winding 29 but instead bursts of the excitation current are applied, and the signals induced in the sensor windings are only detected between the bursts of the excitation current. This mode of operation is referred to as pulse echo and works because the resonator 41 continues to resonate after the burst of excitation current has ended.

As mentioned above, the sensor windings are periodic and are in spatial phase quadrature. Therefore, the four signals induced in the four sensor windings from the resonant circuit 41 can be approximated by:

$$E_{31} = Ae^{-t/\tau} \sin\left[\frac{2\pi x}{L_x}\right] \cos\left[2\pi F_o t + \phi\right] \quad (1)$$

$$E_{33} = Ae^{-t/\tau} \cos\left[\frac{2\pi x}{L_x}\right] \cos\left[2\pi F_o t + \phi\right] \quad (2)$$

$$E_{35} = Ae^{-t/\tau} \sin\left[\frac{2\pi y}{L_y}\right] \cos\left[2\pi F_o t + \phi\right] \quad (3)$$

$$E_{37} = Ae^{-t/\tau} \cos\left[\frac{2\pi y}{L_y}\right] \cos\left[2\pi F_o t + \phi\right] \quad (4)$$

where A is a coupling coefficient which depends upon, among other things, the distance of the stylus from the windings and the number of turns in the sensor windings; x is the x-position of the resonant stylus relative to the sensor windings; y is the y-position of the resonant stylus relative to the sensor windings; $L_x$ is a spatial wavelength of the sensor windings in the x-direction and is typically slightly greater than the width of the board in the x-direction (and in this embodiment is 70 mm); $L_y$ is a spatial wavelength of the sensor windings in the y-direction and is typically slighter greater than the width of the board in the y-direction (and in this embodiment is 50 mm); $e^{-t/\tau}$ is the exponential decay of the resonator signal after the burst of excitation signal has ended, with $\tau$ being a resonator constant which is equal to the quality factor of the resonant circuit 41 divided by the product of pi ($\pi$) and the resonant frequency of the resonant circuit 41; and ø is an electrical phase shift caused by a difference between the fundamental frequency of the excitation current and the resonant frequency of the resonator 41. In this embodiment, the resonant stylus 5 is designed so that its resonant frequency changes with the pressure applied to the tip of the stylus. This change in frequency causes a change in the phase shift ø and therefore by measuring the phase shift ø it can be determined whether or not the tip of the resonant stylus 5 is pressed into contact with the LCD 3.

Figure 4A:
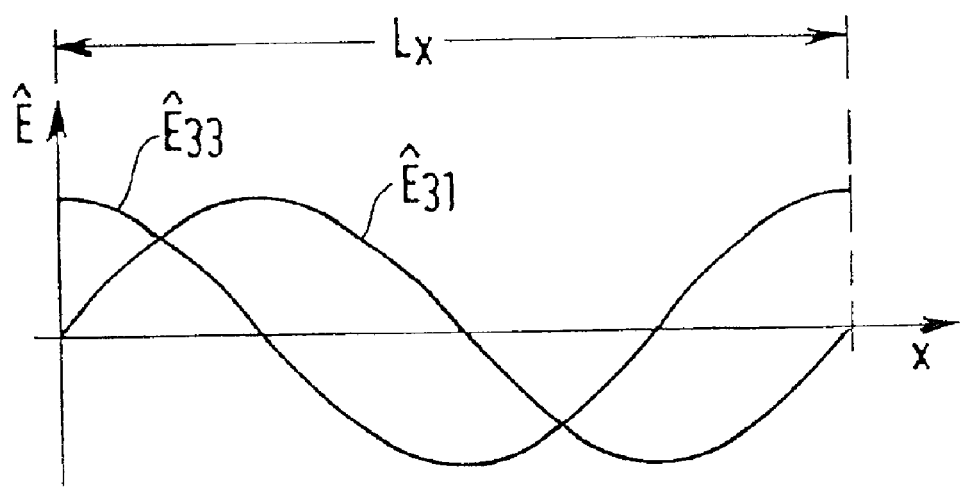
FIG. 4a schematically illustrates an approximation of the way in which the peak amplitude of the signals induced in x-sensor windings of the digitising system vary with the x-coordinate of the position of the stylus relative to the liquid crystal display.
Figure 4B:
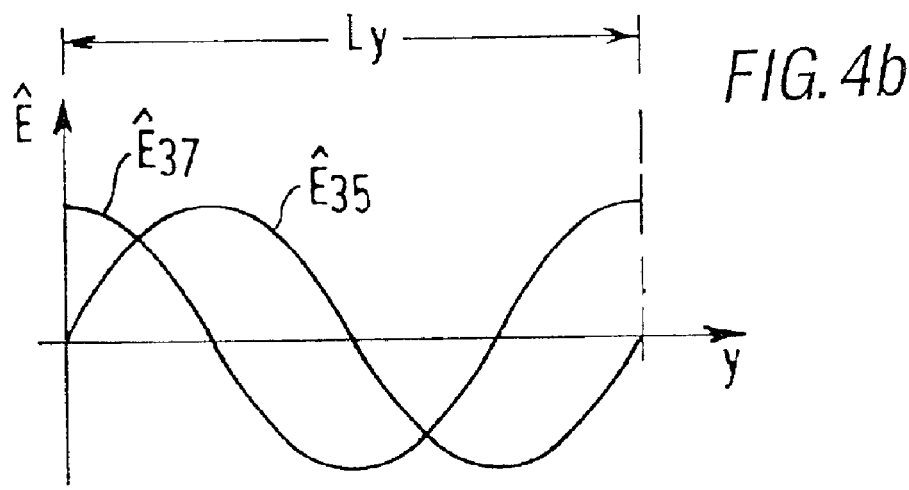
FIG. 4b schematically illustrates an approximation of the way in which the peak amplitude of the signals induced in y-sensor windings of the digitising system vary with the y-coordinate of the position of the stylus relative to the liquid crystal display.

As can be seen from equations (1) to (4), the peak amplitude of the signals induced in the sensor windings vary as the sin or cos of either the x or y position. This is illustrated in FIGS. 4a and 4b. In particular, FIG. 4a illustrates the way in which the peak amplitude of the signal induced in sensor winding 31 and the way in which the signal induced in sensor winding 33 varies with the x-position of the resonant stylus relative to the sensor windings and FIG. 4b shows the way in which the peak amplitude of the signals induced in sensor winding 35 and sensor winding 37 vary with the y-position of the resonant stylus relative to the sensor windings. As shown in FIG. 4, the pitch ($L_x$) of the windings in the x-direction is greater than the pitch ($L_y$) of the windings in the y-direction. This is because, in this embodiment, the measurement area is rectangular.

Therefore, as those skilled in the art will appreciate, both the x-y position information of the resonant stylus 5 and the phase shift ø can be determined from the signals induced in the sensor windings by suitable demodulation and processing. As shown in FIG. 3, this demodulation is achieved by connecting each of the four sensor windings to a respective two of the eight mixers 69-1 to 69-8, where for each sensor winding the induced signal is multiplied by a square wave at the same frequency as and in phase with the excitation current in one of the respective mixers and is multiplied by a square wave signal at the same frequency as and 90° out of phase with the excitation current in the other of the respective mixers. This generates an in phase (I) component and a quadrature phase (Q) component of each of the demodulated signals. In this embodiment, the in phase components of the demodulated signals from all the sensor windings are used to determine the position information and the in phase and quadrature phase components of the demodulated signal from one of the sensor windings are used to determine the electrical phase shift (i.e. ø). As shown in FIG. 3, the output from each mixer 69-1 to 69-8 is input to a respective integrator 71-1 to 71-8 which, after being reset, integrates the output from the mixer over a time period which is a multiple of $1/F_0$ (in order to reduce the effect of error signals from the mixer at the fundamental frequency, for example clock feed-through). The following equations approximate the outputs from the integrators 71-1 to 71-4:

$$\sin\_x\_I = A_1 \sin\left[\frac{2\pi x}{L_x}\right] \cos\phi \quad (5)$$

$$\sin\_x\_Q = A_1 \sin\left[\frac{2\pi x}{L_x}\right] \sin\phi \quad (6)$$

$$\cos\_x\_I = A_1 \cos\left[\frac{2\pi x}{L_x}\right] \cos\phi \quad (7)$$

$$\cos\_x\_Q = A_1 \cos\left[\frac{2\pi x}{L_x}\right] \sin\phi \quad (8)$$

where $A_1$ is a constant which varies with, among other things, the constant A, the resonator constant $\tau$ and the integration period. Similar signals are obtained from integrators 71-5 to 71-8, except these vary with the y-position rather than with the x-position.

As shown in FIG. 3, the outputs from the integrators 71 are input to an analogue-to-digital converter 73 where they are converted into digital signals which are input to the digital processing and signal generation unit 59 via the A to D interface unit 75. The digital processing and signal generation unit 59 then performs an arc tangent function (a tan 2) on the ratio of the sin\_x\_I signal and the cos\_x\_I signal to determine the x-position of the resonant stylus and similarly performs an arc tangent function on the ratio of the sin\_y\_I signal and the cos\_y\_I to determine the y-position of the resonant stylus 5. The digital processing and signal generation unit 59 also calculates an arc tangent function on the ratio of the quadrature phase component to the in phase component of the signals from one of the sensor windings, in order to determine the phase angle ø.

As shown in FIG. 3, both the in phase (I) and quadrature phase (Q) components of the signal induced in each of the sensor windings are measured. This is because, at certain x and y positions, the ratio of the in phase and quadrature phase components from the sensor windings will not be reliable. This occurs when the sin or cos position components are approximately zero. Therefore, in this embodiment, the digital processing and signal generation unit 59 determines the phase angle ø using a weighted combination of the in phase and quadrature phase signals from both the sin and cos windings, where the weighting used varies in dependence upon the determined x and y position of the stylus.

After the digital processing and signal generation unit 59 has determined the current x-y position of the resonant stylus and determined whether or not the stylus has been brought into contact with the LCD 3, it outputs this information to the PDA electronics through the interface unit 77.

This information is then used by the PDA electronics to control information displayed on the LCD 3 and the PDA's mode of function. In this embodiment, the excitation and position determining circuitry 49 performs the above calculations five hundred times per second.

A brief description has been given above of the way in which the digitiser system of the present embodiment determines the x-y position of the resonant stylus relative to the sensor windings. The particular form of excitation and sensor windings used and the particular resonant stylus, digital processing and excitation signals used in this embodiment will now be described in more detail.

Digitiser Windings

Figure 5A:
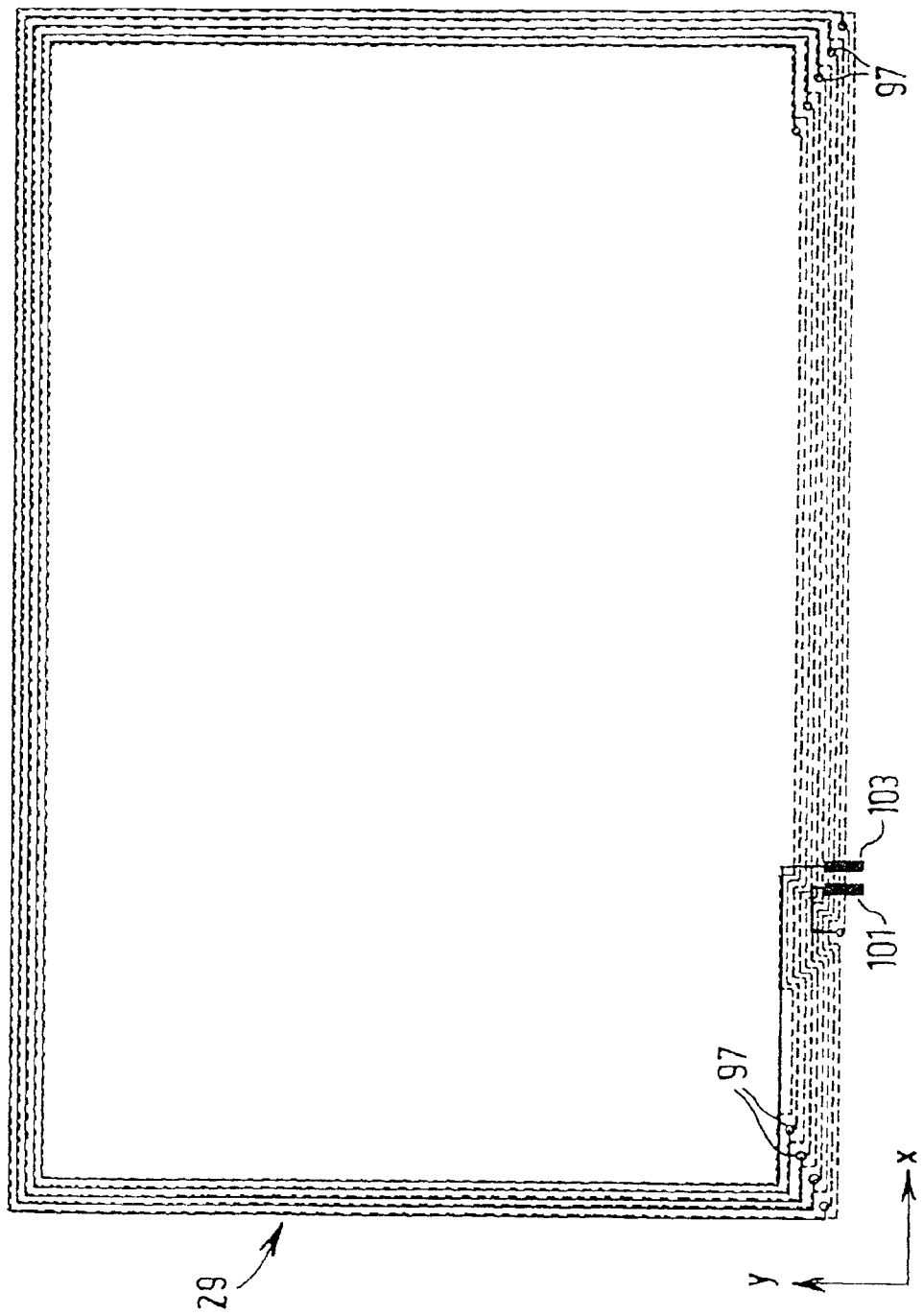
FIG. 5a illustrates the form of the excitation winding of the digitising system which forms part of the personal digital assistant shown in FIG. 1.

FIG. 5*a* illustrates the form of the excitation winding 29 used in this embodiment. The winding 29 is formed by five turns of rectangular conductor on each side of the sensor PCB 13 which are connected in series at through holes or vias, some of which are labelled 97. In FIG. 5*a*, the conductors on the top layer of the sensor PCB 13 are shown as solid lines whilst those on the bottom layer of the sensor PCB are shown as broken lines. FIG. 5*a* also shows the two connection pads 101 and 103 used to connect the ends of the excitation winding 29 to the excitation driver 51. In this embodiment, the excitation winding 29 is wound around the outside of the sensor windings (not shown).

Figure 5B:
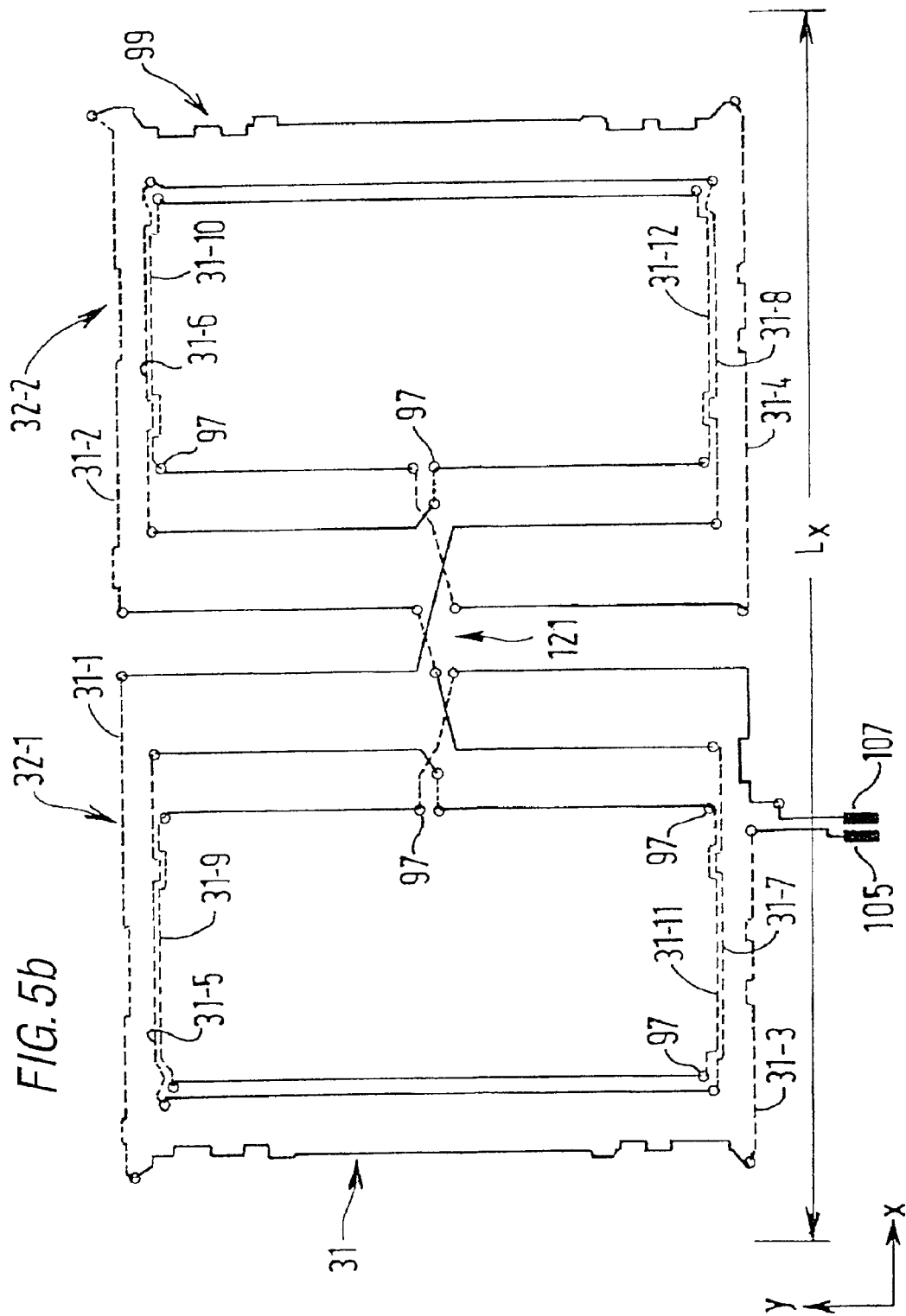
FIG. 5b illustrates the form of a sin x sensor winding of the digitising system which forms part of the personal digital assistant shown in FIG. 1.

FIG. 5*b* shows the printed conductors which form the sin x sensor winding 31. Again, the printed conductors on the top layer of the sensor PCB 13 are shown as solid lines whilst those on the bottom layer are shown as dashed lines. As shown, the conductor tracks which extend substantially in the y-direction are provided on the top layer of the sensor PCB 13 and those which extend substantially in the x-direction are provided on the bottom layer of the sensor PCB 13 and the ends of the conductor tracks on the top layer are connected to the ends of the conductor tracks on the bottom layer at the via holes, some of which are labelled 97. FIG. 5*b* also shows the two connection pads 105 and 107 which are provided for connecting the sin x sensor winding 31 to the digitiser electronics.

As shown, the conductor tracks of the sin x sensor winding 31 are connected to form two sets of loops 32-1 and 32-2 which are arranged in succession along the x-direction. As those skilled in the art will appreciate, if a point magnetic field source (or something similar such as the resonant stylus) is moved across the sensor winding 31, then the magnetic coupling between the point source and the sensor winding 31 will vary approximately sinusoidally with the x-position of the point source. There will be little or no variation with the y-position.

FIG. 5*c* shows the printed conductors which form the cos x sensor winding 33. Again, the printed conductors on the top layer of the sensor PCB 13 are shown as solid lines whilst those on the bottom layer are shown as dashed lines. FIG. 5*c* also shows the two connection pads 109 and 111 which are provided for connecting the cos x sensor winding 33 to the digitiser electronics. As shown, the conductor tracks of the cos x sensor winding. 33 are connected to form three sets of loops 34-1*a*, 34-2 and 34-1*b* which are arranged in succession along the x-direction.

As with the sin x sensor winding, when the resonant stylus 5 is moved across the sensor winding 33, the magnetic coupling between the resonant stylus 5 and the cos x sensor winding 33 varies approximately sinusoidally with the x-position of the stylus 5. However, since the sets of loops of the cos x sensor winding 33 are shifted in the x-direction by a quarter of the winding pitch ($L_x$), the sinusoidal variation will be in phase quadrature to the variation of the sin x sensor winding 31. As a result, the signal induced in the sensor winding 33 by the resonant stylus 5 has a peak amplitude which approximately varies as the cosine of the x-position of the stylus 5.

Figure 5D:
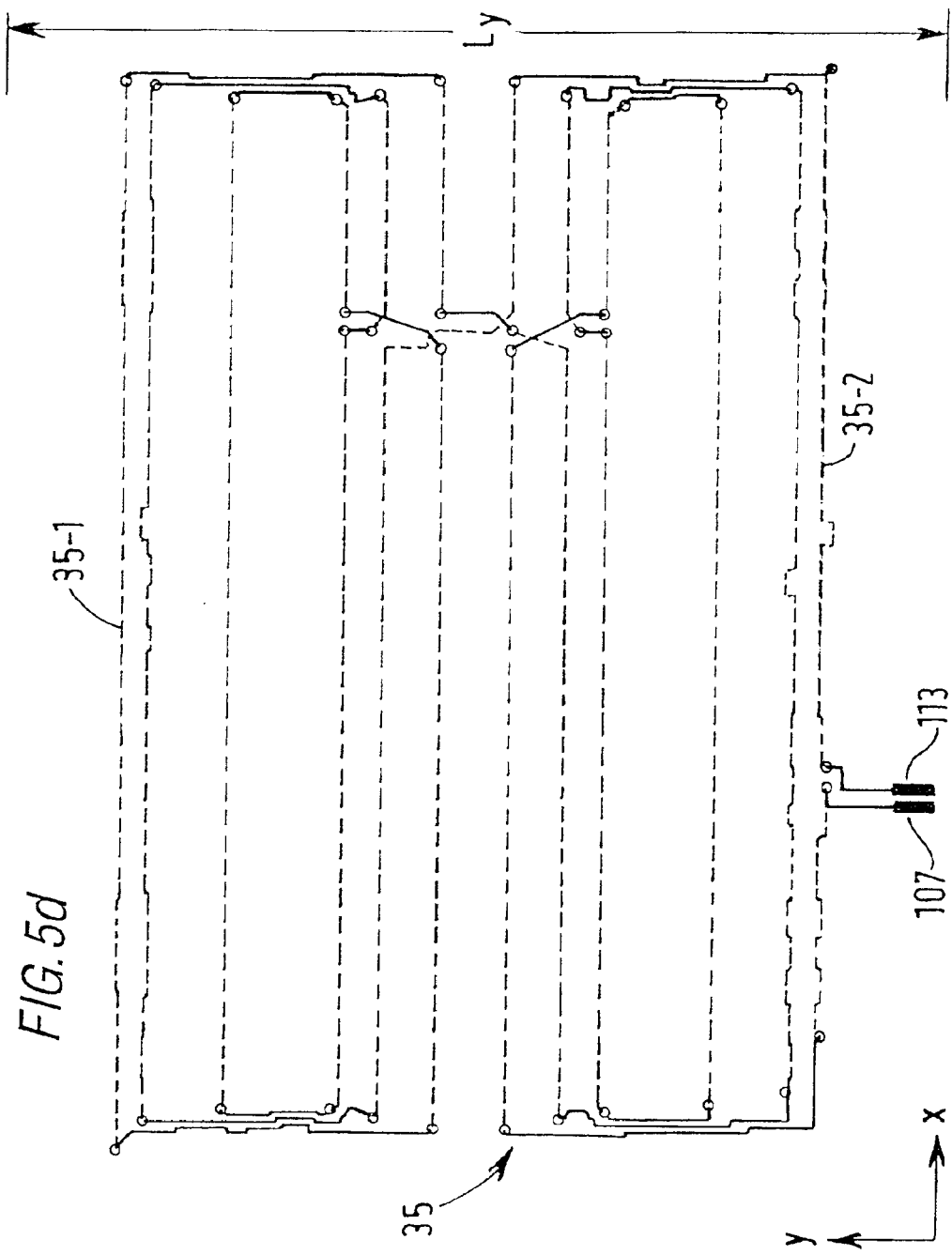
FIG. 5d illustrates the form of a sin y sensor winding of the digitising system which forms part of the personal digital assistant shown in FIG. 1.
Figure 5E:
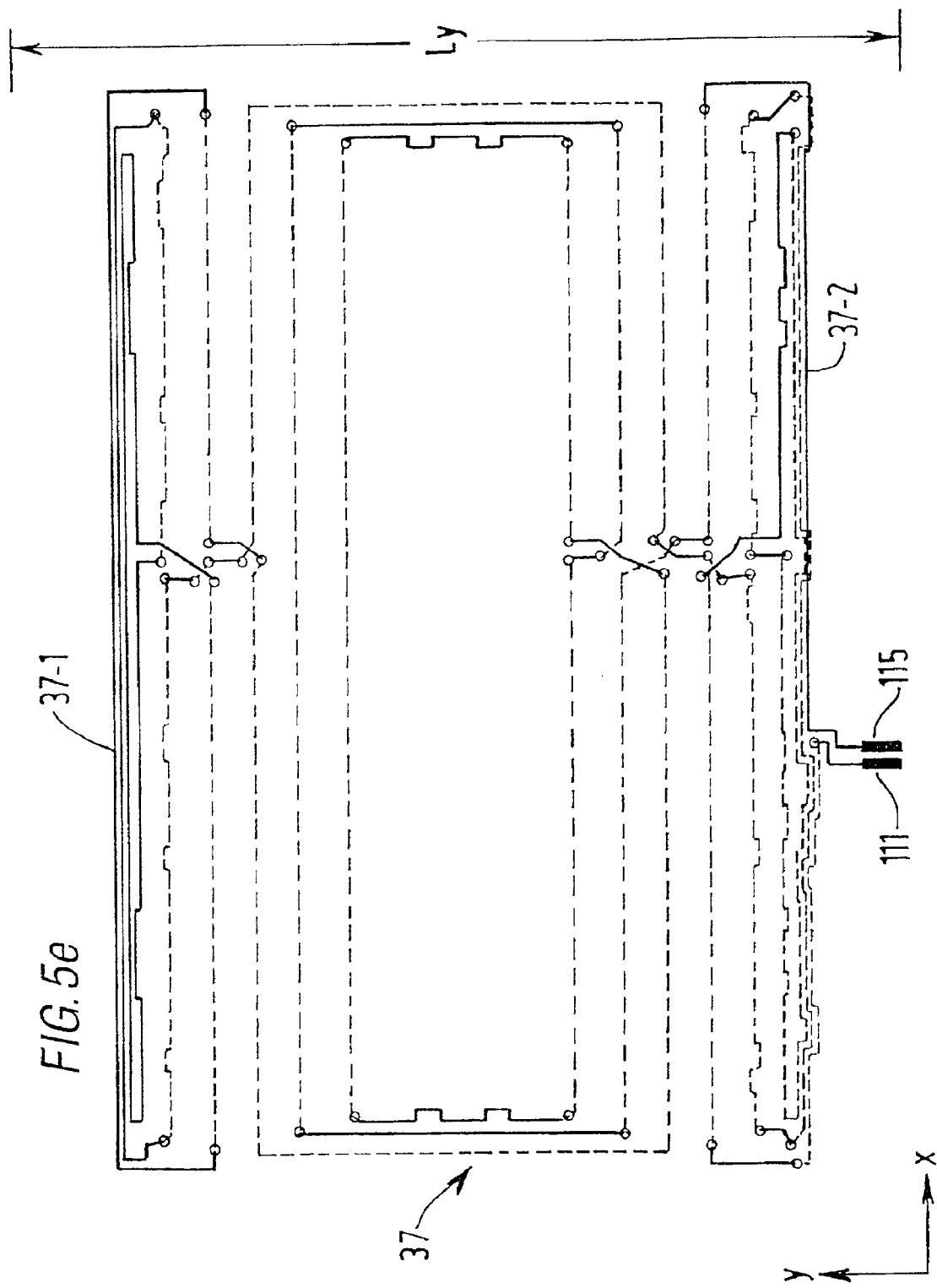
FIG. 5e illustrates the form of a cos y sensor winding of the digitising system which forms part of the personal digital assistant shown in FIG. 1.
Figure 5F:
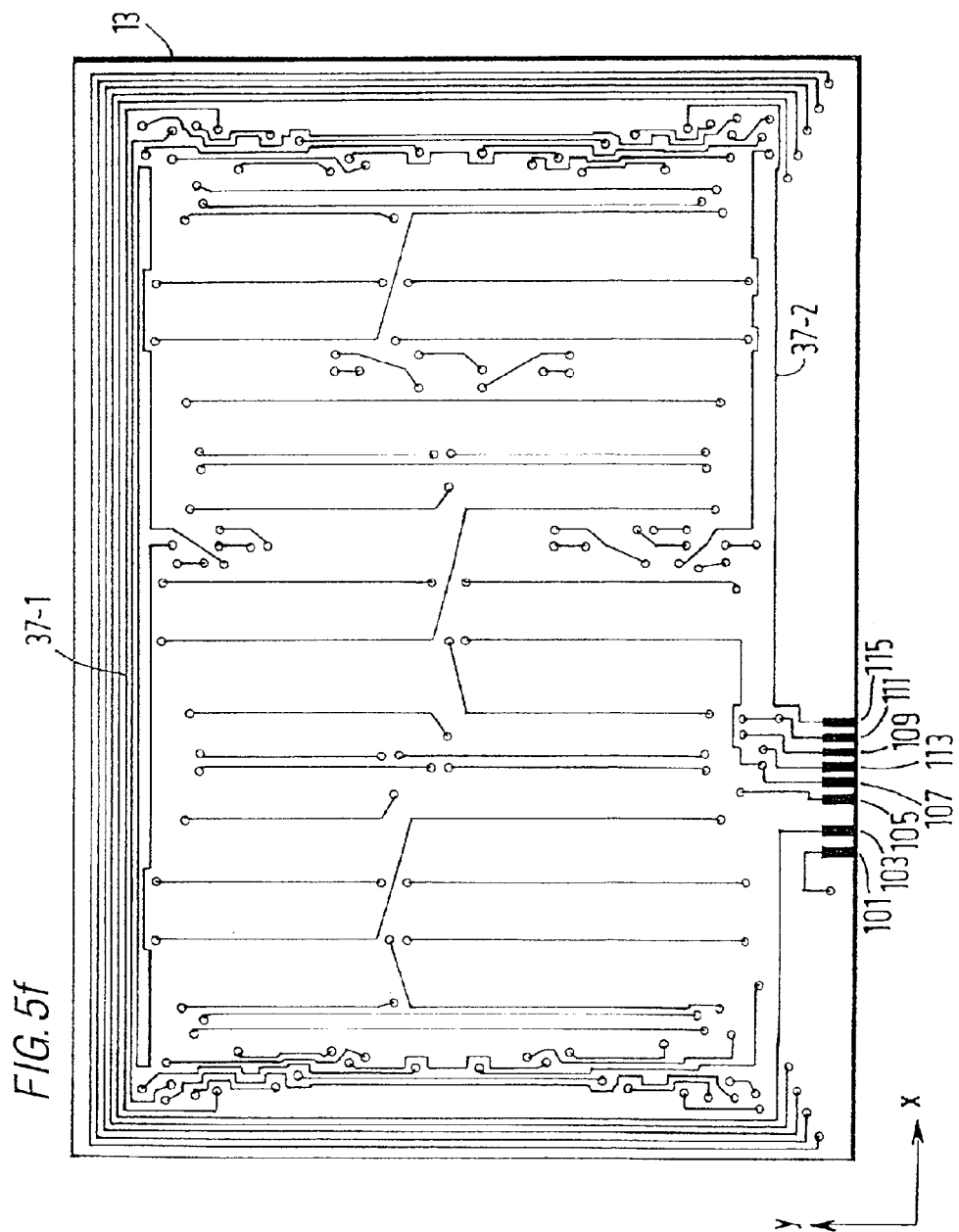
FIG. 5f shows a top layer of a printed circuit board which carries the windings shown in FIGS. 5a to 5e.

FIGS. 5*d* and 5*e* show the printed conductors which form the sin y sensor winding 35 and the cos y sensor winding 37. As shown in these figures, these sensor windings are similar to the sin x and cos x sensor windings except they are rotated through 90°. As shown in FIGS. 5*d* and 5*e*, the sin y sensor winding 35 shares the connection pad 107 with the sin x sensor winding 31 and the cos y sensor winding 37 shares the connection pad 111 with the cos x sensor winding 33. FIG. 5*f* shows the top layer of printed conductors and FIG. 5*g* shows the bottom layer of printed conductors of the sensor PCB 13 which together form the excitation winding 29 and the sensor windings 31, 33, 35 and 37.

Stylus

FIG. 6 shows the resonant stylus 5 used in this embodiment in cross-section. As shown, the stylus comprises a hollow front body portion 152 and a hollow rear body portion 154 which house: the resonant circuit comprising the inductor coil 45 and the capacitor 43 (not shown); a 2 mm diameter ferrite rod 153; a first movement-limiting member 155; a second movement-limiting member 157; a nib 159; and a spring 163.

A more detailed description and explanation of the layout of the excitation and sensor windings and of the stylus used in this embodiment can be found in International Patent Application No. PCT/GB99/03989, the whole contents of which are hereby incorporated by reference.

Digital Processing and Signal Generation Unit

As shown schematically in FIG. 7, the digital processing and signal generating unit 59 includes an interface unit 77 via which a processor 171 in the digital processing and signal generation unit 59 communicates with a processor (not shown) which controls the PDA electronics, allowing system set-up information to be transmitted from the PDA processor to the processor 171 and the x-y position of the resonant stylus 5 on the LCD 3 to be transmitted from the processor 171 to the PDA processor. The processor 171 is also connected to a read only memory (ROM) 173, which stores control procedures (such as initialisation routines) and a random access memory (RAM) 175 which provides working space for the digital signal processing.

The processor 171 sends control parameters to a digital waveform generator 179 which, in accordance with the control parameters, generates the control signals TXA and TXB for the excitation driver 51 and the in-phase and quadrature-phase mixing signals for the mixers 69-1 to 69-8. In this embodiment, the digital waveform generator 179 is software-based with the timings at which TXA, TXB, in-phase out and quadrature out are switched between a +1 state, a −1 state and a 0 state being determined using the control parameters sent by the processor 171. An analog to digital interface 181 receives the digital signals from the analog to digital converter 73 and transfers them to the processor 171 where they are processed to obtain the x-position and the y-position of the stylus and the phase information (ø) for the stylus as described above.

Excitation Driver

Figure 8:
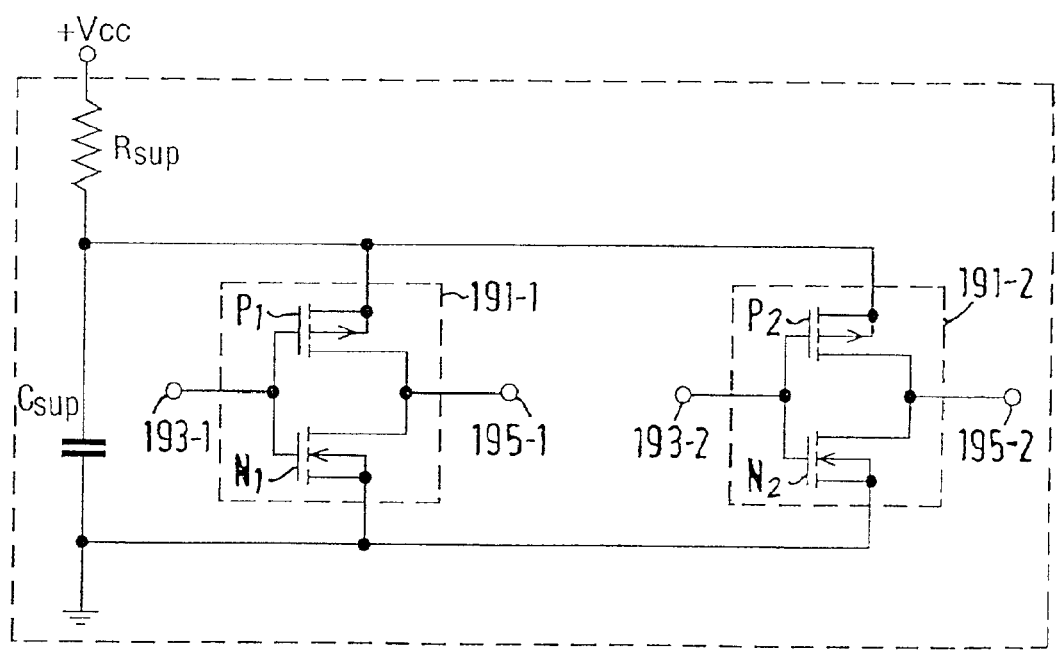
FIG. 8 is a circuit diagram illustrating in more detail the form of an excitation driver which forms part of the excitation and processing circuitry shown in FIG. 3.

FIG. 8 shows a circuit diagram of the excitation driver 51 employed in this embodiment. As shown, the excitation driver 51 comprises two amplification circuits 191-1 and 191-2 which are connected in parallel between the supply voltage $V_{CC}$ and ground. A supply resistance $R_{sup}$ and a supply capacitance $C_{sup}$ are included to minimise the ripple current introduced into the supply rails by the operation of the excitation circuit. The amplification circuit 191-1 comprises a p-channel MOSFET switch $P_1$ and a n-channel MOSFET switch $N_1$ with the drain of $P_1$ connected to the drain of $N_1$ and the gates of $P_1$ and $N_1$ connected to each other. The amplification circuit 191-1 has an input terminal 193-1, located at the common gate of $P_1$ and $N_1$, to which the drive signal TXA is applied and an output terminal 195-1, located at the connection between the drain of $P_1$ and the drain of $N_1$, which is connected to the connection pad 101 of the excitation winding 29. Amplification circuit 191-2 is formed in an identical manner to amplification circuit 191-2 using a p-channel MOSFET switch $P_2$ and a n-channel MOSFET switch $N_2$ and the drive signal TXB is applied to the input terminal 193-2 of the amplification circuit 191-2, and the output terminal 195-2 of the amplification circuit 191-2 is connected to the connection pad 103 of the excitation winding 29. In this embodiment low resistance MOSFET switches are used.

The excitation voltage applied across the excitation winding 29 is the voltage between the output terminals 195-1 and 195-2 of the amplification circuits 191-1 and 191-2 respectively and will therefore vary according to the drive signals TXA and TXB as indicated in table 1.

TABLE

Variation of excitation voltage with TXA and TXB

| TXA | TXB | EXCITATION VOLTAGE (V) |
|---|---|---|
| 0 | 0 | 0 |
| 0 | 1 | $+V_{cc}$ |
| 1 | 0 | $-V_{cc}$ |
| 1 | 1 | 0 |

Excitation Signals

The performance of the x-y digitising system illustrated in FIG. 3 will now be discussed for a number of exemplary excitation signals. The performance is assessed by considering computer simulations of the performance in which the effect of $R_{sup}$ and $C_{sup}$ has been assumed to be negligible. Although this assumption is not necessarily true in practice, the conclusions derived from these computer simulations are still valid and have been verified experimentally. For all the examples, the resonant circuit 41 has a resonant frequency of 100 kHz and a quality factor of 40 and the excitation sequence is repeated at a frequency of 500 Hz. However, a number of parameters are varied in the examples, in particular the inductance $L_{ex}$ and the AC resistance at 100 kHz $R_{ex}$ of the excitation winding 29, the resistance $R_n$ of the n-channel MOSFET switches and the resistance $R_p$ of the p-channel MOSFET switches.

EXAMPLE 1

In example 1, $L_{ex}$ is 25 µH, $R_{ex}$ is 10 ohms, $R_n$ is 1 ohm and $R_p$ is 3 ohms. FIG. 9a shows the excitation voltage which is applied across the excitation winding 29 in this example for a single excitation sequence. As shown, the excitation sequence comprises a series of alternating positive and negative pulses which, unlike a conventional excitation sequence which is a square wave, have periods between the pulses during which the excitation voltage is returned to zero. The fundamental frequency of the excitation sequence is 100 kHz, corresponding to a fundamental excitation period of 10 µs, with the duration of each pulse, apart from the first and last positive pulses, set to 0.75 µs and with each of the pulses being separated by a period of 4.25 µs. Therefore, for the middle pulses, the ratio of the time in the fundamental excitation period during which either a positive or negative pulse is applied to the excitation winding to the duration of the fundamental period, which will hereinafter be referred to as the middle_pulse_ratio, is 0.15. In this embodiment the supply applies an EMF of 3.3V across the ends of the excitation winding 29, which is a typical value for a battery-powered device.

FIG. 9b shows a timing diagram for the form of the excitation current, that is the current flowing through the excitation winding 29, as a result of the excitation voltage shown in FIG. 9a being applied across the excitation winding. As shown, the excitation current reaches a peak value when the excitation pulses are applied and then decays exponentially when the excitation voltage is set equal to zero. This exponential decay is caused because even with no EMF applied across the excitation winding 29, current can continue to flow due to a back EMF of the excitation winding 29 caused by the winding's inductance $L_{ex}$. In practice, the excitation current may initially decay more rapidly than shown in FIG. 9b due to AC losses for the excitation coil which may arise, for example, if the excitation coil couples with any metal forming part of the PDA 1. However, this does not effect the conclusions drawn from this and the following examples.

In this example, the EMF across the excitation winding 29 is turned to zero by switching on both the n-channel MOSFET switches $N_1$ and $N_2$, rather than the p-channel MOSFET switches $P_1$ and $P_2$, by setting TXA and TXB equal to 1. Therefore, when the EMF across the excitation winding 29 is set to zero the excitation current decays whilst circulating through $N_1$, $N_2$ and the excitation winding 29. The decay time constant, which corresponds to the time required for the amplitude of the excitation current to reduce to 37% of its maximum value, is given by:

$$\text{decay time constant} = \frac{L_{ex}}{R_{ex} + 2R_n}$$

Inserting the values used in this example into equation 9 gives a value for the decay time constant of 2 µs.

Although the same decay time constant could be achieved using p-channel MOSFET switches having an on-resistance of 1 ohm and setting the excitation voltage to zero by switching these p-channel MOSFET switches on (by setting TXA and TXB to zero), it costs approximately three times more to manufacture a p-channel MOSFET with the same resistance as a n-channel MOSFET because p-channel devices require approximately three times the area of silicon compared with n-channel devices. A useful measure of driver cost is therefore:

$$\text{relative\_driver\_size} = \frac{1}{R_n} + \frac{3}{R_p} \quad (10)$$

Inserting the values of $R_n$ and $R_p$ for example 1 into equation 10 gives a relative_driver_size of 2.

FIG. 9c shows the current drawn from the power supply during the excitation sequence. As shown, current is only drawn from the power supply when the excitation pulses are applied. Further, except for the first excitation pulse, when an excitation pulse is applied current initially flows in the reverse direction, returning power to the supply. This is because the decaying excitation current from the previous excitation pulse has not reduced to zero and therefore some of the remaining energy contained in the electromagnetic field generated by the excitation winding 29 is returned to the power supply.

FIG. 9d illustrates the EMF induced into one of the sensor windings. As shown in FIG. 9d, EMF is induced into the sensor winding via two separate mechanisms, namely:

(1) coupling from the resonant stylus 5 which results in a build-up during the excitation sequence and decay thereafter; and
(2) direct coupling from the excitation winding during excitation.

The second mechanism is not present after the last pulse of the excitation sequence and therefore, in the pulse-echo system, is not present when the EMFs induced in the sensor windings are measured in order to determine the position of the resonant stylus 5.

A measure of the sensed power can be determined by calculating the power that would be dissipated through a load of 10 ohms connected across a sensor winding during the period between excitation sequences multiplied by the excitation-echo sequence repetition rate, which for this example gives a sensed power of 9.435 µW. The supply power, which corresponds to the energy drawn from the power supply during an excitation sequence multiplied by the excitation-echo sequence repetition rate, is calculated to be 0.713 mW. Therefore, a measure of the power-efficiency of this example, determined by dividing the sensed power by the supply power, is 1.32%.

This power efficiency represents an order of magnitude improvement over the power-efficiency obtainable in conventional x-y positioning devices utilising the coupling of electromagnetic energy such as that described in U.S. Pat. No. 4,878,553 discussed above.

Further, if the excitation sequence illustrated in FIG. 9a was applied to the x-y positioning device described in U.S. Pat. No. 4,878,553 then the power efficiency would actually reduce. This is because the load of the supply voltage is substantially resistive, due to the presence of the switching and multiplexing circuitry, and therefore the decay time constant will be short and the excitation current will substantially follow the waveform of the applied excitation voltage. This leads to a reduction in the amplitude of the component of the excitation current at the fundamental frequency $F_0$. This results in a poor coupling of energy from the excitation current to the resonant stylus.

In this example, by reducing the resistive component of the load, the decay time constant is increased compared to the x-y positioning device described in U.S. Pat. No. 4,878,553 which has the effect of increasing the amplitude of the component of the excitation current at the fundamental frequency, resulting in an improved coupling between the excitation winding and the resonant circuit in the resonant stylus.

As will be described in more detail hereinafter, the duration of the last pulse of the excitation sequence is shorter than the middle pulses so that the excitation current flowing through the excitation winding 29 is driven to zero, thereby reducing any slowly-varying component from the signal induced in the sensor windings after the last excitation pulse. As will also be described hereinafter, the duration of the first pulse of the excitation sequence is reduced in comparison with the middle pulses in order to reduce any slowly-varying component in the excitation current flowing while the excitation pulses are applied which may also persist after the excitation sequence during the period when the induced signals in the sensor windings are measured.

EXAMPLE 2

In the first example the resistance of the n-channel MOSFET switches is less than the resistance of the p-channel MOSFET switches, which is preferential because it provides a low cost way of increasing the decay time constant of the excitation circuit. A second example will now be described to illustrate that this feature is not essential to obtain a significant advantage over conventional position sensing systems using inductive coupling.

The parameters for the second example are identical to those of the first example except that $R_n$ and $R_p$ are both set to 2 ohms. Referring to equation (10), this gives a relative_driver_size of 2 which is identical to that of the first example and therefore the cost of implementing the first and second examples is not significantly different. In the second example, a supply power of 0.724 mW gives a sensed power of 8.328 µW and therefore the power efficiency is 1.15%. Although the power efficiency in the second embodiment is over 10% reduced from that of the first embodiment due to increased power dissipation in $N_1$ and $N_2$, this power efficiency still represents a significant improvement over conventional systems.

EXAMPLE 3

In the first example the power supply applies an EMF of 3.3 volts across the excitation winding 29 when the excitation pulses are applied. A third example will now be described with reference to FIGS. 10a to 10d in which the supply voltage applies an EMF of 2.1 volts across the excitation winding 29, the remaining parameters of the excitation driver and the excitation winding 29 being identical to those of the first example.

As shown in FIG. 10a, the duration of the excitation pulses, apart from the first and last excitation pulses, for this example is increased to 1.25 µs which gives a middle_pulse_ratio of 0.25. This increase in the middle_pulse_ratio is introduced in order to ensure that the magnitude of the sensed power for a given stylus position is similar to that in example 1 and therefore the resolution is not substantially affected. As shown in FIG. 10b, the excitation current follows substantially the same shape as shown in FIG. 9b for the first example. FIG. 10c shows the current drawn from the power supply for this example and, as shown, is similar to that shown in FIG. 9c. FIG. 10d shows the EMF induced in the sensor winding and shows that the amplitude of the direct coupling between the excitation winding and the sensor winding has been reduced with the reduction in supply voltage.

For the third example, a sensed power of 9.8 µW is calculated for a supply power of 0.727 mW which gives a power efficiency of 1.35%, comparable to that of the first example.

From the third example it can be seen that the resolution of the digitiser system can be maintained approximately constant for different supply voltage levels without significantly changing the power efficiency by varying the duration of the excitation pulses, in particular by making the pulse width inversely proportional to the supply voltage.

EXAMPLE 4

In the first to third examples, the last excitation pulse was shortened so that the excitation current is driven to zero when the last excitation pulse ends. A fourth example will now be described with reference to FIGS. 11a to 11d in which the system parameters are identical to those of the third example, except that the shortened final pulse has been removed.

FIG. 11a shows the excitation voltage sequence applied across the excitation winding 29 for the last four excitation pulses and FIG. 11b shows the corresponding excitation current. As shown in FIG. 11b, when the last excitation pulse ends the excitation current gradually decays from the peak level to zero. This decaying current induces a voltage in sensor windings which causes an offset to be introduced into the detection process which may result in position error.

As shown in FIG. 11c, at the end of the excitation sequence no current flows from the excitation winding 29 to the power supply. FIG. 11d shows the EMF induced in the sensor winding and the sensed power is calculated to be 9.708 µW for a supply power of 0.728 mW giving a power efficiency of 1.33%. The power efficiency is therefore not significantly affected by having all the excitation pulses of the same duration, but the accuracy of the detected position may be affected by the induced offset voltage caused by the decaying excitation current after the last excitation pulse.

EXAMPLE 5

A fifth example will now be described with reference to FIGS. 12a to 12d to illustrate more clearly the effect of reducing the duration of the last excitation pulse. The parameters and excitation sequence of this fifth example are identical to those of the first example except that $R_{ex}$ (the resistance of the excitation winding 29) has been set to 2 ohms and therefore the time decay constant, calculated from equation 9, is increased to 6.25 µs.

FIG. 12a illustrates the last five excitation pulses of the excitation sequence for this example and shows that the duration of the final excitation pulse is less than half that of the previous excitation pulses. FIG. 12b illustrates the excitation current which, because of the long time delay constant, decays to only approximately half its peak amplitude between excitation pulses. As shown, the excitation current is driven rapidly to substantially zero by the last pulse of the excitation sequence. FIG. 12c illustrates the supply current and shows that during the last excitation pulse, the energy stored in the excitation winding 29 is returned to the power supply as the excitation current is driven to zero.

FIG. 12d shows the EMF induced in the sensor winding for this example. A sensed power of 14.321 µW is calculated for a supply power of 0.347 mW giving a power efficiency of 4.13%. This power efficiency is significantly larger than that of the first to fourth examples because the increase in the time decay constant (caused by the reduction in the resistance of the excitation winding 29) causes a greater proportion of the excitation current to be at the fundamental frequency. In practice, this reduction of the resistance of the excitation winding 29 can be achieved by increasing the thickness and/or width of the conductors printed on the sensor PCB 13. However, as the gap between the printed conductors cannot be reduced below a set figure, increasing the width of the printed conductors also requires an increased size of the sensor PCB 13, which for many applications is not desirable.

EXAMPLE 6

FIGS. 13a to 13d illustrate a sixth example in which the load of the excitation circuit is made almost entirely inductive. For this example, the inductance of the excitation winding 29 is set to 50 µH and the resistance of the excitation winding 29, the n-channel MOSFET switches and the p-channel MOSFET switches are all set to 0.1 ohms. The remaining parameters are identical to those of the first embodiment.

FIG. 13a illustrates the last five excitation pulses of the excitation sequence for this example. As shown, the length of each of the excitation pulses apart from the last is 2.5 µs, which is also the duration of the zero applied EMF period between the excitation pulses. The middle_pulse_ratio is therefore 0.5. As shown in FIG. 13b, because the load is almost entirely inductive, the rate of change of the excitation current is proportional to the excitation voltage. As shown in FIG. 13c, approximately the same amount of current is returned to the power supply as is drawn from the power supply since there are very little resistive losses in the excitation circuit. The duration of the last excitation pulse is approximately half the duration of the previous excitation pulses which results in the excitation current being zero at the end of the last pulse. FIG. 13d shows the induced EMF in the sensor winding.

Although it would be impracticable to build an excitation circuit or an excitation winding for a real device having the system parameters used in this example, it does illustrate clearly the dynamics of the excitation current in the excitation winding 29 and how a final pulse can be added to the excitation sequence whose duration is set to drive the excitation current to zero.

EXAMPLE 7

As described previously, it is preferred that the duration of the first excitation pulse of the excitation sequence is also reduced compared to the middle pulses. FIGS. 14a to 14d illustrate a seventh example in which the duration of the first excitation pulse is set equal to the duration of the subsequent excitation pulses. For this example $R_n$, $R_p$ and $R_{ex}$ are 0.1 ohms, $L_{ex}$ is 50 µH and the supply voltage is 3.3V. The load is therefore predominantly inductive.

Figure 14A:
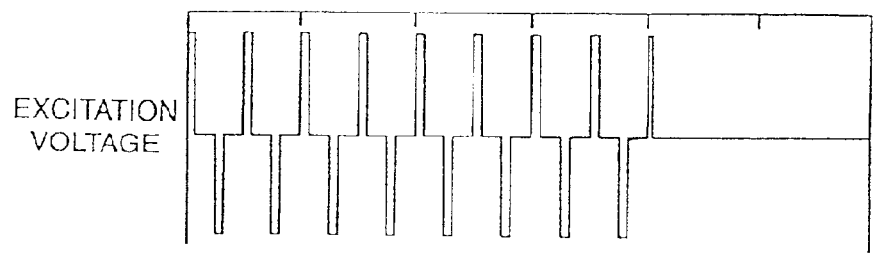
FIG. 14a is a timing diagram illustrating the form of an excitation voltage sequence applied by the excitation winding of the excitation and processing electronics shown in FIG. 3 in a seventh example.
Figure 14B:
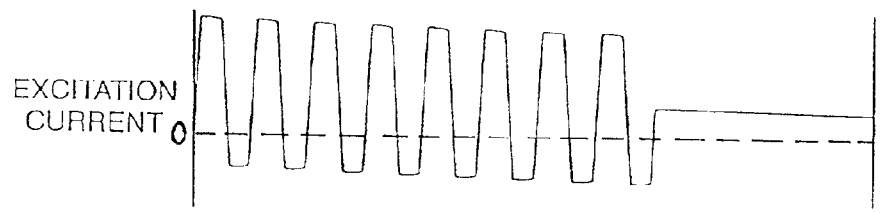
Figure 14C:
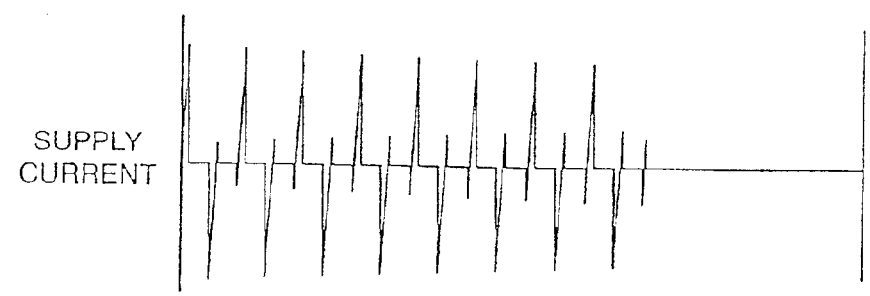
Figure 14D:
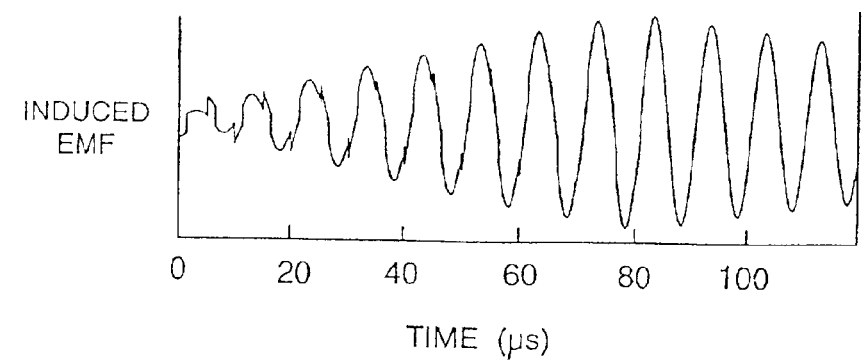
FIG. 14d is a timing diagram illustrating the form of an electromotive force induced in a sensor winding by the resonant stylus when the excitation voltage shown in FIG. 14a is applied to the excitation winding.

FIG. 14a illustrates the excitation voltage for an excitation sequence. The middle_pulse_ratio for this excitation sequence is 0.3. FIG. 14b illustrates the excitation current which, as shown, exhibits a slowly-varying component which causes the peak amplitude of the positive pulses to decay gradually throughout the excitation sequence while the peak amplitude of the negative pulses increases gradually. It can also be seen from FIG. 14b that the slowly-varying component persists after the final pulse of the excitation sequence. The slowly-varying component in the excitation current is disadvantageous because it drains a significant current from the power supply and therefore increases the supply power, leading to a decrease in the power efficiency. FIG. 14c illustrates the current drawn from the power supply and, as shown, the net flow of current to the power supply on application of a negative pulse gradually lessens during the excitation sequence while the net flow of current to the power supply on application of a positive pulse gradually increases. FIG. 14d shows the induced EMF in the sensor winding.

From the seventh example it can be seen that if all the excitation pulses in the excitation sequence have the same duration then a slowly-varying component is added to the excitation current which causes additional power to be drawn from the power supply.

EXAMPLE 8

Figure 15A:
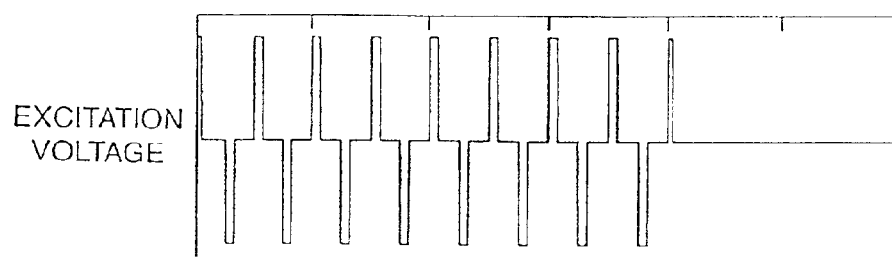
FIG. 15a is a timing diagram illustrating the form of an excitation voltage applied by the excitation winding of the excitation and processing electronic shown in FIG. 3 in an eighth example.
Figure 15B:
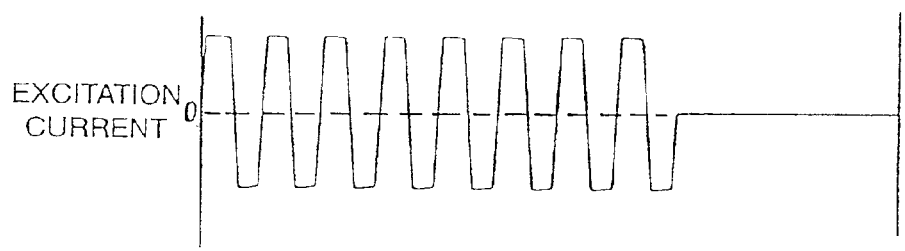

An eighth example will now be described with reference to FIGS. 15a to 15d in which the parameters and the excitation waveform (shown in FIG. 15a) are identical to those of the seventh example, except that the duration of the start pulse is set equal to half the duration of the subsequent excitation pulses. As illustrated in FIG. 15b, the excitation current in this example has a negligible slowly-varying component.

Figure 15C:
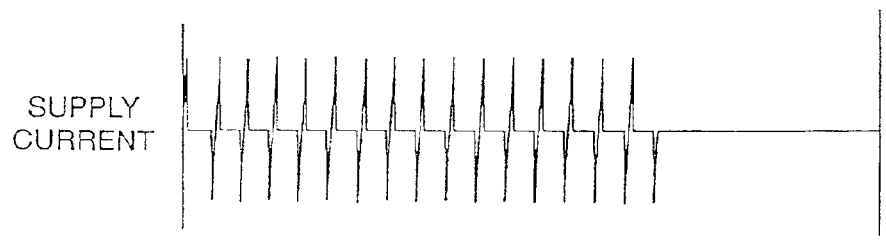
Figure 15D:
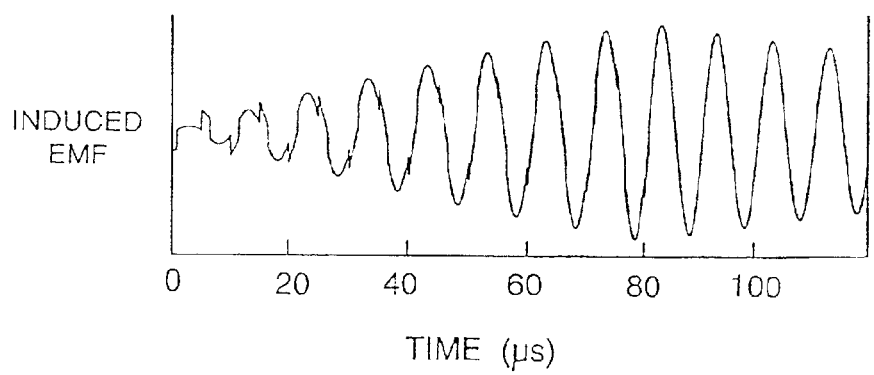
FIG. 15d is a timing diagram illustrating the form of an electromotive force induced in a sensor winding by the resonant stylus when the excitation voltage shown in FIG. 15a is applied to the excitation winding.

FIG. 15c illustrates the current drawn from and returned to the power supply and, as shown, apart from the first excitation pulse and the last excitation pulse, the net current drawn from the power supply is substantially zero due to the inductive nature of the load. FIG. 15d shows the induced EMF in the sensor winding.

As described previously, the excitation current can be returned more rapidly to zero at the end of the excitation sequence by setting the duration of the last excitation pulse to be less than that of the previous excitation pulses. An alternative technique for returning the excitation current to zero more quickly is to reduce the time decay constant of the excitation circuit after the last excitation pulse has been applied. An excitation driver which implements this alternative technique will now be described with reference to FIG. 16 in which components which are identical to the excitation driver illustrated in FIG. 8 have been labelled with the same reference signs and will not be described again.

Figure 16:
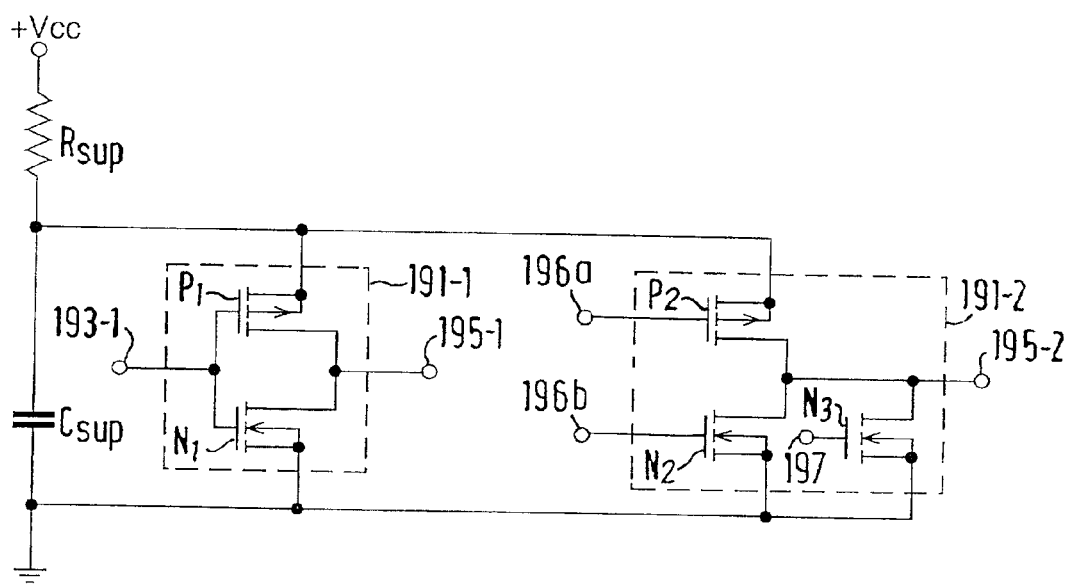
FIG. 16 is a circuit diagram illustrating an alternative form of the excitation driver of the excitation and processing circuitry shown in FIG. 3.

As shown in FIG. 16, the amplification circuit 191-2 has been altered by separating the gates of the switches $P_2$ and $N_2$ and including an additional n-channel MOSFET switch $N_3$, whose drain is connected to the output terminal 195-2 and whose source is connected to electrical ground. The gates of $P_2$ and $N_2$ are connected to input terminals 196a and 196b respectively which are in turn connected to outputs TXC and TXD from a digital signal generation and processing unit (not shown), while the gate of $N_3$ is connected to an input terminal 197 which is in turn connected to an output TXE from the digital signal generation and processing unit (not shown). $N_3$ has a significantly larger on-resistance than $N_1$ and $N_2$. During the excitation sequence TXC and TXD are operated to turn $P_2$ and $N_2$ on and off as described in the previous examples while $N_3$ is set in the off state, by setting TXE low, and therefore no current circulates through it. However, after the final excitation pulse of the excitation sequence $P_2$ and $N_2$ are both turned off and the signal TXE is set high which switches on $N_3$ so that the excitation current circulates through the excitation winding 29, $N_1$ and $N_3$. As a result, since $N_3$ has a higher on-resistance than $N_2$, the time constant of the excitation will be shorter and hence the excitation current will decay to zero more quickly than if the current circulates through $N_2$. Once the excitation current has decayed to a negligible amount $N_2$ is turned back on and $N_3$ is turned off.

EXAMPLE 9

In the previous examples the excitation sequence has consisted of alternating single positive excitation pulses and single negative excitation pulses. FIGS. 17a to 17d illustrate an alternative example in which rather than alternating single pulses, alternating double pulses are used. In this example the parameters and the middle_pulse_ratio are identical to those of the first example.

Figure 17:
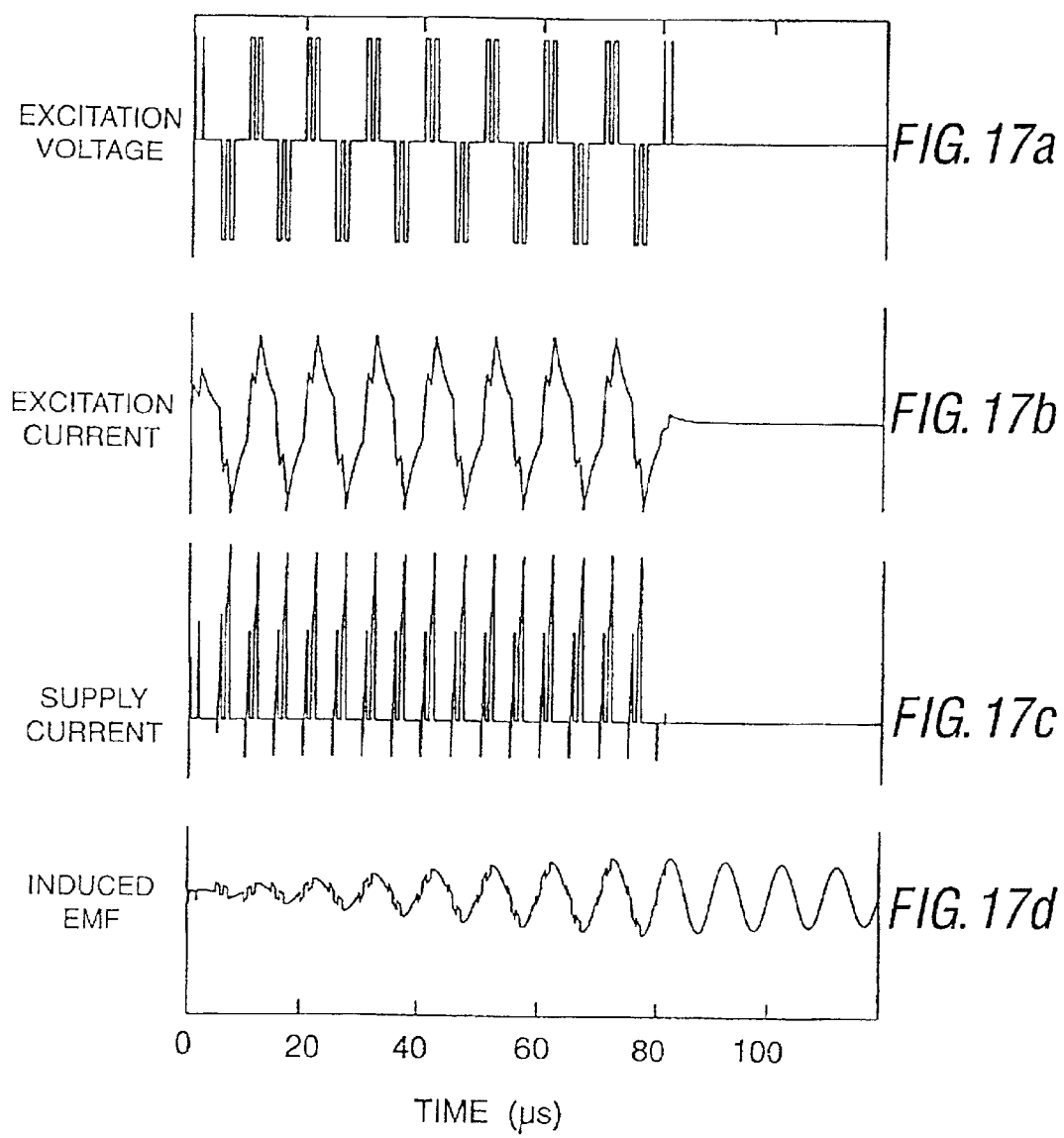

FIG. 17a illustrates the excitation voltage applied across the excitation winding 29 and, as shown, the sign of the excitation pulses changes every other pulse. The excitation current, as shown in FIG. 17b, is noticeably more sinusoidal indicating an increase in the proportion of the excitation current at the fundamental frequency $F_0$. FIG. 17c shows the current drawn from the power supply and FIG. 17d shows the induced EMF in the sensor winding. For this example, a sensed power of 29.894 µW was calculated for a supply power of 2.029 mW, giving a power efficiency of 1.47%. This is appreciably higher than that of the first example. This is because of the increase in the proportion of the excitation current at the fundamental frequency $F_0$.

EXAMPLE 10

Figure 18:
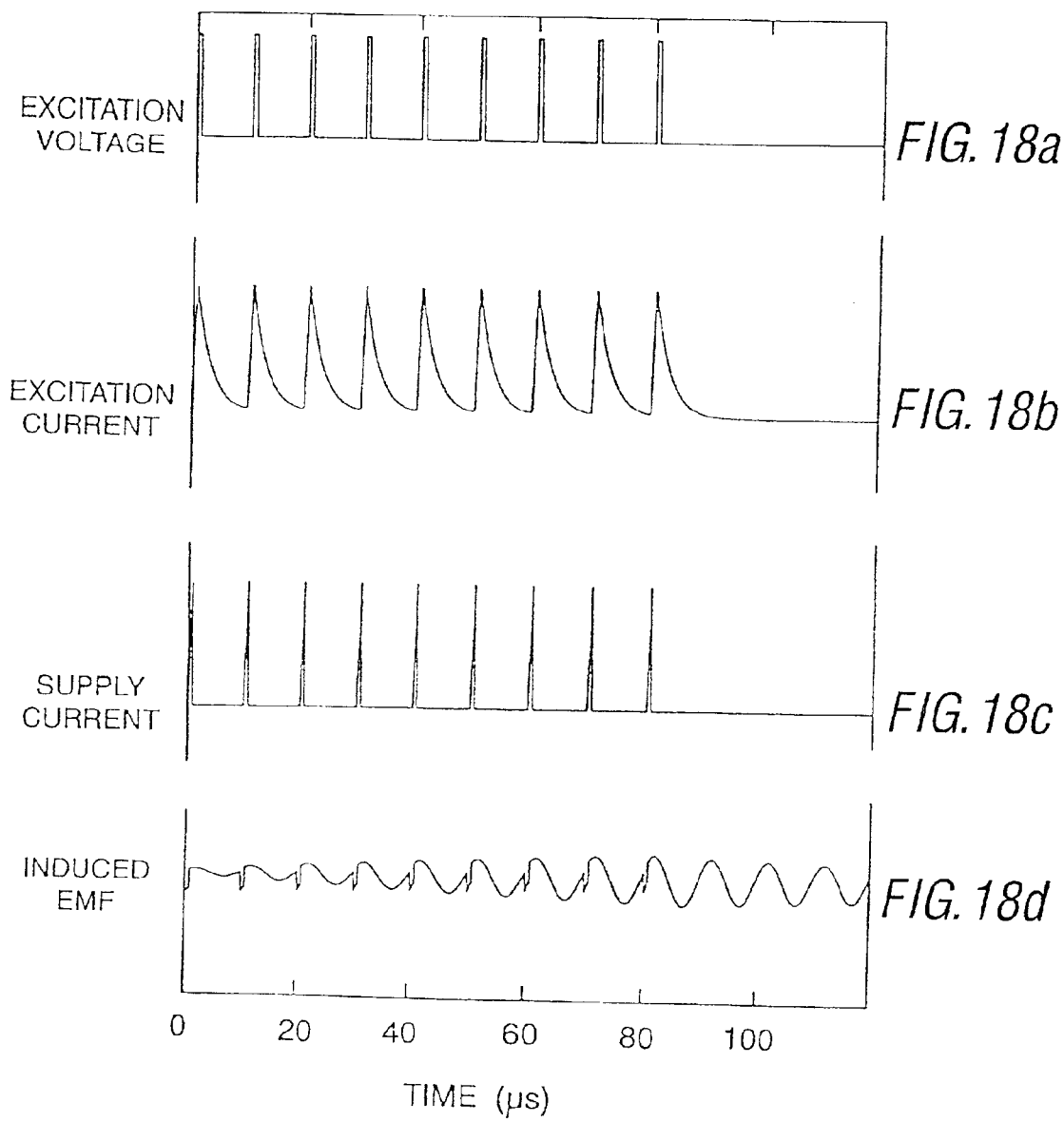

The excitation drivers previously described provide both positive and negative excitation pulses across the excitation winding 29. However, this is not essential and excitation pulses which are all of the same sign can also be used. FIGS. 18a to 18d illustrate a tenth example in which a single-ended excitation driver is used. For this example $R_n$ is 0.333 ohms, $R_p$ is 3 ohms, $R_{ex}$ is 10 ohms, $L_{ex}$ is 25 µH and the supply voltage is 3.3V. FIG. 18a illustrates the excitation sequence applied across the excitation winding 29 in this example. As shown, the excitation sequence comprises a series of positive peaks separated by periods in which no EMF is applied and the middle_pulse_ratio is 0.15. FIG. 18b illustrates the resulting excitation current. As shown, the excitation current decays from its peak value to almost zero between each excitation pulse. FIGS. 18c and 18d show respectively the current drawn from the power supply and the EMF induced in the sensor winding in this example. For this example, a sensed power of 3.369 µW was calculated for a supply power of 0.545 mW, giving a power efficiency of 0.618%. Although this power efficiency is less than that for the double-ended excitation circuit (due to the large slowly-varying component in the excitation current drawing surplus current from the power supply) this still represents a significant improvement over conventional excitation driving circuitry.

A single-ended excitation driver can be made by modifying the excitation driver shown in FIG. 8 by removing the amplification circuit 191-2 and connecting the connection pad 103 of the excitation winding 29 to the zero volt supply rail. The skilled person will appreciate that this results in a simplification of the excitation driver and the digital waveform generator 179 because the control signal TXB does not need to be generated.

EXAMPLE 11

Figure 19:
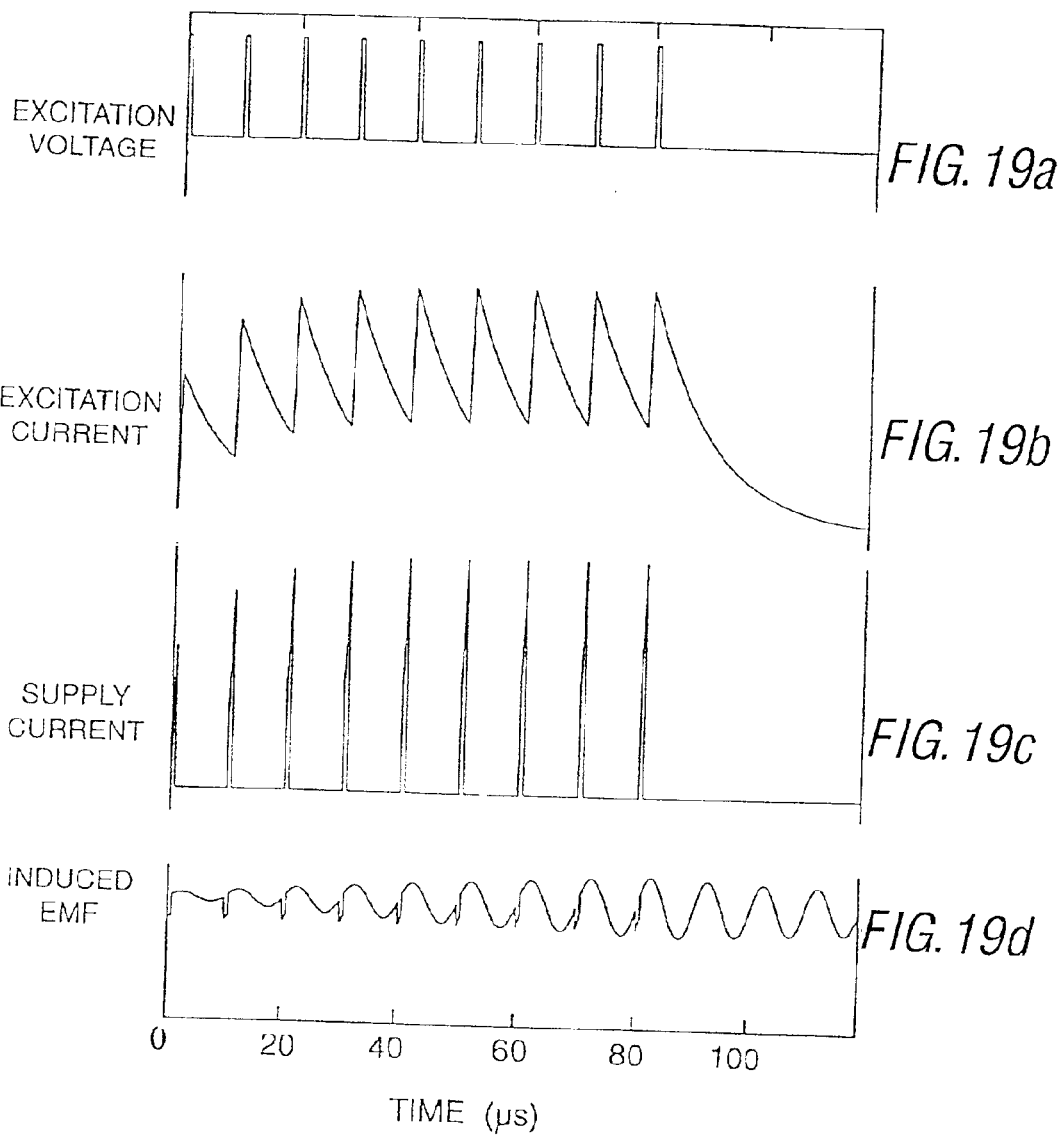

As described above, in the tenth example the excitation current decays almost to zero between excitation pulses. This is advantageous because otherwise the amplitude of the excitation current will gradually increase giving rise to a slowly-varying component in the excitation current which draws additional current from the power supply compared to the tenth example. An eleventh example will now be described with reference to FIGS. 19a to 19d in which the parameters are the same as in the tenth example except that the resistance of the excitation winding 29 is been reduced to 2 ohms which increases the time decay constant. The excitation sequence, as shown in FIG. 19a, is substantially identical to that in the tenth example but the excitation current, as shown in FIG. 19b, differs markedly because the excitation current does not have time to return to zero between pulses. FIG. 19c illustrates the current drawn from the power supply and, as shown, the current drawn from the power supply gradually increases. FIG. 19d shows the EMF induced in the sensor winding. With this arrangement, a sensed power of 4.72 µW was calculated for a supply power of 1.254 mW giving a power efficiency of 0.376%. Thus, the power efficiency has been reduced due to the reduction of the proportion of the excitation current at the fundamental frequency $F_0$.

The following conclusions can be derived from the above examples:
1) An improved power efficiency can be achieved by using excitation pulses which are separated by periods in which no power is added to the excitation circuit.
2) This improved power efficiency is most evident when the resistive losses in the excitation driver are low enough that the time decay constant for the excitation current is significantly increased because a greater portion of the excitation current is at the resonant frequency of the resonant circuit 41 in the stylus 5. The present inventors have found that, in practice, the benefits of increasing the time decay constant become appreciable when the time decay constant is longer than the duration of the pulses of excitation voltage.

3) It is advantageous to reduce the excitation current rapidly at the end of the excitation sequence to reduce excitation breakthrough from the excitation winding to the sensor windings.

4) The excitation current can be rapidly reduced at the end of an excitation sequence by reducing the duration of the last excitation pulse in comparison with previous excitation pulses.

5) The excitation current can also be rapidly reduced at the end of an excitation sequence by including in the excitation circuitry means for switching the time decay constant to a low value at the end of the excitation sequence.

6) It is advantageous for the first excitation pulse to be of shorter duration than subsequent excitation pulses because a slowly-varying component of the excitation current during and after the excitation sequence is reduced, thereby reducing the current drawn from the power supply and position errors.

7) When using low resistance MOSFET switches, if the excitation current flows through n-channel switches for the majority of the time then it is preferred to use p-channel switches with a larger on-resistance than the n-channel switches. This is advantageous because it is cheaper to make low-resistance n-channel MOSFET switches than low-resistance p-channel MOSFET switches.

8) The exact duration of the excitation pulses can be adjusted depending on the power supply voltage to ensure that a relatively constant signal is induced in the sensor windings across power supply variations. In particular, it is advantageous to vary the pulse duration inversely with the power supply voltage.

The skilled person will appreciate from the above that the form of the excitation sequence will depend upon the application, in particular upon the supply power and the resonant frequency of the resonant stylus. From a manufacturing point of view it is advantageous if the digitising electronics 49 can be used for many different applications. This can be achieved with the digital processing and signal generation unit 59 described with reference to FIGS. 3 and 7 because the PDA processor can send information relating to the power supply voltage and the resonant frequency of the stylus to the processor 171 via the interface 77 during an initialisation procedure and the processor 171 can then adjust the pulse duration and frequency accordingly.

For battery-powered devices a nominal value for the power supply voltage may not be sufficient because the voltage of a battery can vary significantly over its lifetime. A solution to this problem is for the digital processing and signal generation unit 59 to monitor directly the battery voltage and adjust the pulse duration accordingly. In one embodiment, the battery voltage is monitored by connecting the battery to the A to D converter 73 which converts the voltage into a digital signal which can then be monitored on a regular basis by the processor 171 via the A to D interface 181.

Another technique of improving the power efficiency is to reduce the power drawn from the power supply when the stylus is not in the vicinity of the LCD 3. This could be done by reducing the repetition rate at which the excitation sequences are applied. Alternatively, this can also be done by keeping this repetition rate constant but by varying the duration of the excitation pulses. In particular, it is possible to use shorter pulses when the stylus is away from the LCD 3 because good position accuracy is not required until the stylus is close to the LCD 3. It can be determined using these short pulses when the stylus is close to the LCD 3 and then longer pulses can be used for accurate position detection. Varying the duration of the excitation pulses is preferred over varying the repetition rate at which the excitation sequences are applied because the amount of time taken to detect the presence of the stylus in the vicinity of the LCD 3 can be reduced.

Modifications and Alternative Embodiments

In the above embodiment, a hand-held personal digital assistant was described which includes an x-y digitising tablet which operates with a resonant stylus. Various novel features of the excitation circuitry have been described which make the system particularly suitable for battery-powered operation. In particular, the reduction in the power drawn from the power supply while maintaining sensed signal levels is advantageous for battery-powered devices because it increases the battery lifetime without affecting the resolution of the devices. The skilled person in the art will appreciate that many of the novel aspects of the system described above are independent of each other.

A number of modifications and alternative embodiments will now be described.

Figure 20:
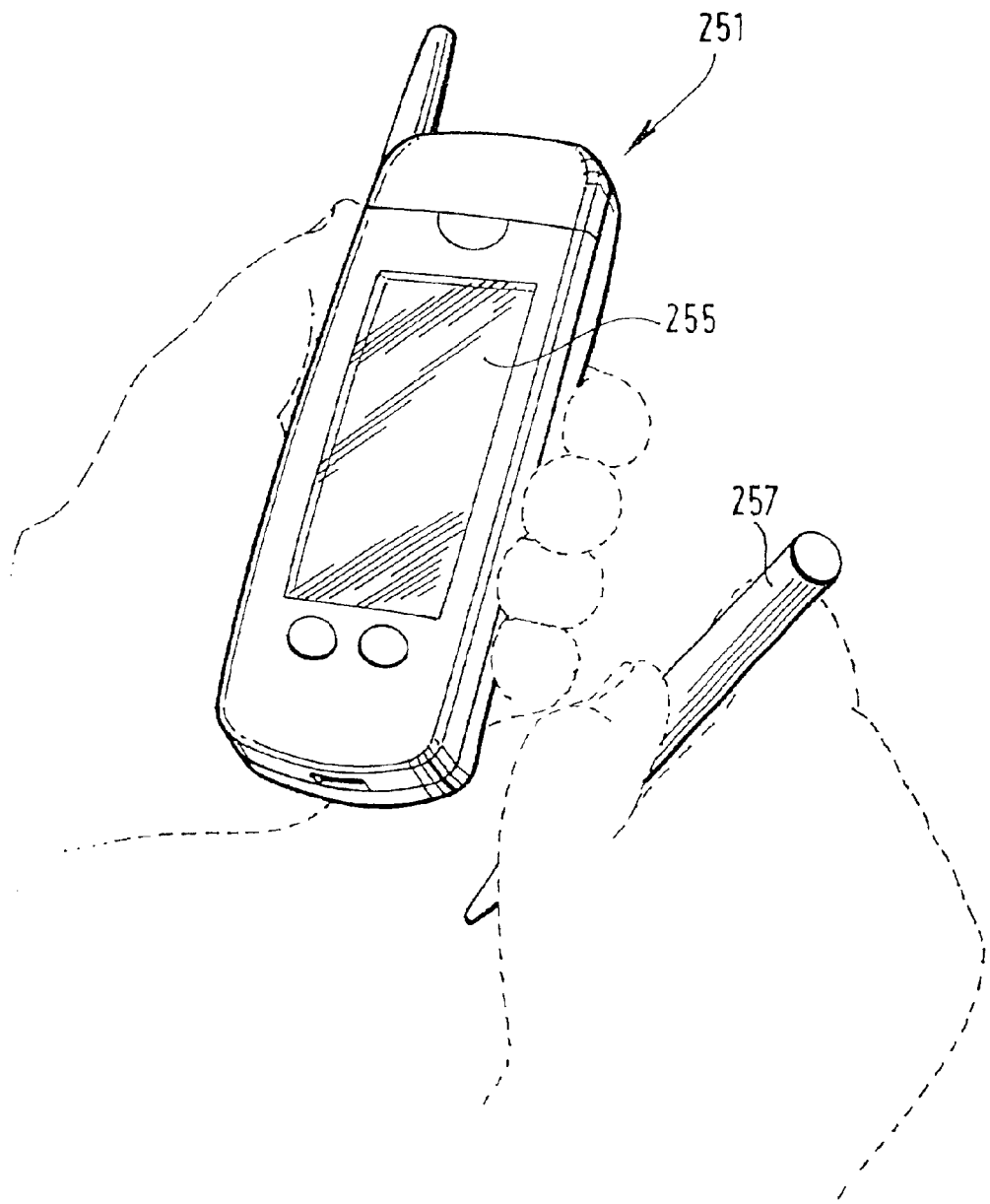
FIG. 20 is a perspective view showing a mobile telephone having a liquid crystal display and a digitising system under the display which is operable to sense the position of a resonant stylus relative to the display.

As those skilled in the art will appreciate, the digitising system described above can be used for various applications. It is particularly useful, however, for low cost high volume consumer products such as PDAs, web browsers and mobile telephones and the like. FIG. 20 illustrates the way in which a mobile telephone 251 may be adapted to include a liquid crystal display 255 and underneath the display an x-y set of digitiser windings such as those described above which are operable to sense the position of a resonant stylus 257. The digitising system may be used to allow the user to create, for example, short text messages which can then be sent by the mobile telephone to another party. If the mobile telephone includes, for example, an organiser, then the digitiser can be used to control the inputting, manipulation and outputting of data from the organiser.

In the above embodiments, the digitiser system employed a number of sensor windings, an excitation winding and a resonant stylus. In an alternative embodiment, rather than using a resonant stylus, a stylus having either a short-circuit coil or a magnetic field concentrator (such as a piece of ferrite) could be used. However, in such embodiments, lower signal levels would be induced in the sensor windings and the system could not operate in the pulse-echo mode of operation since the non-resonant elements do not continue to "ring" after the excitation signal has ended. However, the excitation circuitry and waveforms described above will still provide significant power savings in such "continuous" excitation systems.

Although the circuitry for analysing the signals induced in the sensor windings in the above-described examples used mixers and integrators, alternatively an analog-to-digital converter can be used to directly detect the induced signals and a digital processor can be used to determine the pen position from, for example, the amplitudes and phases of the induced signals. Alternatively, an analogue processing scheme, such as that described in International Patent Application No. WO99/34171, could be utilised to determine the position of the stylus.

A skilled person will recognise that the exact form of the mixing signals used to demodulate the induced signals in the sensor windings can be varied from that described above. For example, the two mixing signals used to demodulate the induced signals in the sensor windings need not be in phase quadrature, although this would increase the complexity of the processing circuit used to determine the position of the stylus.

In the above examples the repetition frequency of the excitation pulses is matched with the resonant frequency of the stylus. This is preferred since it enables an efficient coupling of energy to the resonant circuit. However, other excitation sequences could be used provided that the timing of the excitation pulses is such that the energy stored in the resonant stylus increases during an excitation sequence. For example, one of the positive or negative excitation pulses in the excitation sequence shown in FIG. 9a could be removed and an accurate position measurement still be obtained, although the power efficiency would be reduced due to a reduced proportion of the energy of the excitation sequence being at the fundamental frequency.

In the above examples it has been shown that it is advantageous to shorten the duration of the first and last excitation pulses of an excitation sequence compared to the middle pulses. The skilled person will appreciate that alternatively the duration of the pulse could gradually increase from the beginning of the excitation sequence and gradually decrease towards the end of the excitation sequence.

The excitation circuits described above have been based on MOSFET switching device technology. Bipolar transistors could, however, be used instead, although bipolar devices usually have a significant collector-emitter voltage when conducting current resulting in a disadvantageously high on-resistance. Further, bipolar devices are not typically good conductors in the reverse direction of their normal operating mode which is necessary if a significant amount of current is to be returned to the power supply, although reverse protection diodes, such as Schottky diodes, could be utilised at significant additional expense.

The resonant frequency and the quality factor of the stylus do not need to be fixed, as these can be determined form the signals induced in the sensor windings. In this way additional information, for example which of a plurality of styluses is being used, can be determined. This is particularly advantageous when different users have different styluses.

The techniques described above are equally applicable to position sensors having styluses which contain an active device in addition to the resonant circuit such as the stylus described in U.S. Pat. No. 5,600,105.

The skilled person will recognise that the excitation circuitry and waveforms described above can be applied to other forms of position sensors in which a position is determined by energising an excitation winding and measuring a signal induced in a sensor winding. For example, the position sensor may measure position in one dimension, which can be either linear or rotary. Alternatively, the position sensor may measure position in six dimensions, namely x, y, z, yaw, pitch and roll. In the above embodiments a resonant stylus 5 is used to couple energy from the excitation winding to the sensor winding. In alternative embodiments, the relative position of a first member carrying an excitation winding and a second member carrying a sensor winding can be determined by energising the excitation winding and detecting a signal induced in the sensor winding through coupling of electromagnetic energy.

The skilled person will also recognise that the excitation circuitry and waveforms described above are not limited to the particular types of windings described, but could also be used with traditional Inductosyn type windings.

What is claimed is:

1. A position detector comprising:
   first and second members which are moveable relative to each other;
   said first member comprising an excitation winding and at least one sensor winding:
   an excitation circuit for applying a driving signal to the excitation winding; and
   said second member comprising means for interacting with said windings such that, in response to a driving signal being applied to said excitation winding by said excitation circuit, there is generated in the or each sensor winding an output signal, said interacting means and said windings being arranged so that said output signal varies as a function of the relative position of the first and second members,
   wherein the excitation circuit is arranged to apply a sequence of voltage pulses across said excitation winding, with the duration of said pulses being less than a decay time constant of a current loop formed by said excitation circuit and said excitation winding.

2. A position detector comprising:
   first and second members which are moveable relative to each other;
   said first member comprising an excitation circuit operable to apply a driving signal to the excitation winding; and
   said second member comprising a sensor winding electromagnetically coupled, in use, to said excitation winding, said electromagnetic coupling varying with the relative position of said first and second members such that, in response to a driving signal being applied to said excitation winding by said excitation circuit, there is generated in the sensor winding an output signal which varies as a function of said relative position,
   wherein the excitation driver is arranged to apply a sequence of voltage pulses across said excitation winding, with the duration of said pulses being less than a decay time constant of a current loop formed by said excitation driver and said excitation winding.

3. A position detector according to claim 1 or claim 2, wherein the excitation circuit is fixed relative to the excitation winding.

4. A position detector according to either claim 1 or claim 2, wherein the excitation circuit is arranged to generate an excitation sequence comprising alternating positive and negative voltage pulses.

5. A position detector according to either claim 1, or claim 2, wherein the excitation circuit is arranged to generate an excitation sequence comprising alternating pairs of positive voltage pulses and negative voltage pulses.

6. A position detector according to either claim 1 or claim 2, wherein the excitation circuit is arranged to generate an excitation sequence in which the voltage pulses are separated by periods during which a reduced voltage is applied.

7. A position detector according to claim 6, wherein the excitation circuit is arranged to generate an excitation sequence in which the voltage pulses are separated by periods during which no voltage is applied.

8. A position detector according to either claim 1 or claim 2, wherein the excitation circuit is arranged to generate an excitation sequence in which the voltage pulses are separated by periods during which a reduced voltage is applied, wherein the duration of each voltage pulse is less than the duration of the periods between the voltage pulses.

9. A position detector according to either claim 1 or claim 2, wherein the excitation driver is arranged to generate an excitation sequence comprising a burst of voltage pulse comprising a first pulse, a plurality of intermediate pulses, and an end pulse, wherein the duration of each of the intermediate pulses is substantially the same and the duration of the start pulse is shorter than the duration of the intermediate pulses.

10. A position detector according to claim 9, wherein the excitation circuit is arranged such that the duration of the end pulse is shorter than the duration of the intermediate pulses.

11. A position detector according to either claim 1 or claim 2, wherein the excitation circuit is arranged to generate an excitation sequence comprising a burst of voltage pulses comprising a first pulse, a plurality of intermediate pulses, and an end pulse, wherein the duration of each of the intermediate pulses is substantially the same and the duration of the end pulse is shorter than the duration of the intermediate pulses.

12. A position detector according to either claim 1 or claim 2, wherein the excitation circuit is arranged to repeat the excitation sequence on a periodic basis.

13. A position detector according to either claim 1 or claim 2, wherein the excitation circuit comprises:
    an excitation driver operable to supply the driving signal to the excitation winding; and
    controller operable to generate a control signal defining an excitation sequence, the controller being arranged to supply the control signal to the excitation driver so that the excitation driver is operable to supply the excitation sequence as the driving signal.

14. A position detector according to claim 13, wherein the controller comprises a processor and a memory operable to store instructions for causing the processor to generate the control signal.

15. A position detector according to claim 13, wherein the excitation circuit comprises a modulator operable to modulate the time decay constant.

16. A position detector according to claim 15, wherein the modulator is arranged to vary a resistive loss in the current loop.

17. A position detector according to claim 16, wherein the excitation circuit is arranged such that the resistive loss in the excitation circuit is increased by the modulator after the final excitation pulse of an excitation sequence.

18. A position detector according to claim 13, wherein the controller further comprises a receiver operable to receive set-up information from a host device, the set-up information defining parameters for use in the generation of the excitation sequence.

19. A position detector according to claim 18, wherein the excitation circuit is arranged to vary the duration of the voltage pulses in the excitation sequence in dependence on the information received via the receiver.

20. A position detector according to claim 18, wherein the excitation circuit is arranged to vary the pulse repetition rate of the voltage pulses in the excitation sequence in dependence upon the information received via the receiver.

21. A position detector according to claim 18, wherein the excitation circuit is arranged to repeat the excitation sequence on a periodic basis, the rate at which the excitation sequences are repeated being dependent upon the information received via the receiver.

22. A position detector according to claim 13, wherein the controller further comprises receiver operable to receive a signal indicative of the power supply voltage for the excitation driver, and wherein the controller is operable to vary the control signal such that the duration of the voltage pulses in the excitation sequence is varied in dependence on the indicated power supply voltage.

23. A position detector according to claim 13, further comprising sensor operable to sense whether or not the first and second members are within a sensing range of each other,
    wherein said controller is operable to cause the excitation driver to generate an excitation sequence having excitation pulses with a first duration when the sensor senses that the first and second members are within the sensing range, and with a second duration when the sensor senses that the first and second members are not within the sensing range, the first duration being longer than the second duration.

24. A position detector according to claim 13, wherein the excitation driver comprises switching elements implemented in MOSFET technology.

25. A position detector according to claim 24, wherein the excitation driver comprises at least one n-channel MOSFET switch and at least one p-channel MOSFET switch, the or each n-channel MOSFET switch having a lower on-resistance than the or each p-channel MOSFET switch.

26. A position detector according to claim 24, wherein the excitation circuit is arranged such that during the excitation sequence the or each n-channel MOSFET switch is switched on for a longer time than the or each p-channel MOSFET switch.

27. A position detector according to either claim 1 or claim 2, wherein the apparatus is arranged such that the time decay constant of the current loop incorporating the excitation winding is longer than twice the duration of each of the voltage pulses.

28. A position detector according to either claim 1 or claim 2, wherein the apparatus is arranged such that the time decay constant of a current loop incorporating the excitation winding is longer than five times the duration of each of the voltage pulses.

29. A position detector comprising:
    first and second members which are moveable relative to each other; said first member comprising an excitation winding and at least one sensor winding;
    an excitation circuit for applying a driving signal to the excitation winding; and
    said second member comprising means for interacting with said winding such that, in response to a driving signal being applied to said excitation winding by said excitation circuit, there is generated in the sensor winding an output signal, said interacting means and said windings being arranged so that said output signal varies as a function of the relative position of the first and second members,
    wherein the excitation circuit is operable to apply a sequence of voltage pulses across said excitation winding, with the duration of the first voltage pulse in the excitation sequence being less than the duration of subsequent voltage pulses in the excitation sequence.

30. A position detector comprising:
    first and second members which are moveable relative to each other;
    said first member comprising an excitation winding;
    an excitation circuit for applying a driving signal to the excitation winding; and
    said second member comprising a sensor winding electromagnetically coupled, in use, to said excitation winding, said electromagnetic coupling varying with the relative position of said first and second members such that, in response to a driving signal being applied to said excitation winding by said excitation circuit, there is generated in the sensor winding an output signal which varies as a function of said relative position, wherein the excitation circuit is operable to apply a sequence of voltage pulses across said excitation winding, with the duration of the first voltage pulse in the excitation sequence being less than the duration of subsequent voltage pulses in the excitation sequence.

31. A position detector comprising:

first and second members which are moveable relative to each other;

said first member comprising an excitation winding and at least one sensor winding;

an excitation circuit for applying a driving signal to the excitation winding; and said second member comprising means for interacting with said winding such that, in response to a driving signal being applied to said excitation winding by said excitation circuit, there is generated in the sensor winding an output signal, said interacting means and said windings being arranged so that said output signal varies as a function of the relative position of the first and second members, wherein the excitation circuit is operable to apply a sequence of voltage pulses across said excitation winding, with the duration of the final voltage pulse being less than the duration of previous voltage pulses.

32. A position detector comprising:

first and second members which are moveable relative to each other;

said first member comprising an excitation winding;

an excitation circuit for applying a driving signal to the excitation winding; and said second member comprising a sensor winding electromagnetically coupled to said excitation winding, said electromagnetic coupling varying with the relative position of said first and second members such that, in response to a driving signal being applied to said excitation winding by said excitation circuit, there is generated in the sensor winding an output signal which varies as a function of said relative position, wherein the excitation circuit is operable to apply a sequence of voltage pulses across said excitation winding, with the duration of the final voltage pulse being less than the duration of previous voltage pulses.

33. A portable data input/output device comprising a position detector according to claim 1 or 2.

34. A device according to claim 33, wherein said device is a personal digital assistant.

35. A device according to claim 34, wherein said device is a mobile telephone.

36. A device according to claim 34, wherein said device is battery-powered.

37. A position detector according to claim 14, wherein the excitation circuit comprises a modulator operable to modulate the time decay constant.

38. A position detector according to claim 37, wherein the modulator is arranged to vary a resistive loss in the current loop.

39. A position detector according to claim 38, wherein the excitation circuit is arranged such that resistive loss in the excitation circuit is increased by the modulator after the final excitation pulse of an excitation sequence.

40. A position detector according to claim 1 or 2, wherein said excitation circuit comprises a drive circuit having first and second switching amplifiers connectable between a supply potential and a reference potential and having respective input terminals for receiving respective control signals and respective output terminals to which respective ends of the excitation winding are connected; and wherein said drive circuit is operable to apply a first potential difference having a first polarity across the ends of said excitation winding when a control signal is applied to said first switching amplifier and no control signal is applied to said second switching amplifier, and is operable to apply a second potential difference having a second polarity opposite to the first polarity across the ends of said excitation winding when a control signal is applied to said second switching amplifier and no control signal is applied to said first switching amplifier, in order to generate said sequence of voltage pulses.

41. A position detector according to claim 40, wherein said drive circuit is operable to short circuit the ends of said excitation winding when no control signal is applied to both said first and second switching amplifiers.

42. A position detector according to claim 40, wherein said drive circuit is operable to short circuit the ends of said excitation winding when a control signal is applied to both said first and second switching amplifiers.

43. A position detector according to claim 40, wherein each switching amplifier comprises:

first and second semiconductor switches, each having first and second main electrodes and a control electrode;

wherein the respective control terminals of the first and second semiconductor switches are connected in common to the input terminal so that the control signal is operable to open and close said semiconductor switches;

wherein the output terminal is connected in common to the second main electrode of the first semiconductor switch and the first main electrode of the second semiconductor switch;

wherein the first main electrode of the first semiconductor switch is for connection to said supply potential and the second main electrode of the second semiconductor switch is for connection to said reference potential; and wherein the first main electrode of the first semiconductor switch is for connection to the supply potential and the second main electrode of the second semiconductor switch is for connection to the reference potential.

44. A position detector according to claim 43, wherein the first semiconductor switch is a p-channel semiconductor switch and the second semiconductor switch is an n-channel semiconductor switch.

45. A position detector according to claim 44, wherein the first and second semiconductor switches are MOSFET switches.

46. A position detector according to claim 45, wherein the first semiconductor switch has a greater resistance when closed than the resistance of the second semiconductor switch when closed.

47. A position detector according to claim 1 or 2, wherein the excitation circuit is arranged to generate an excitation sequence of voltage pulses in which the voltage pulses are separated by periods during which no voltage is applied and in which ends of the excitation winding are short circuited.

48. A position detector according to claim 47, wherein the excitation circuit comprises:

first and second semiconductor switches, each having first and second main electrodes and a control electrode, the control electrode being operable to receive a control signal for opening and closing the semiconductor switch;

wherein the first main electrode of the first semiconductor switch is connected to a first potential and the second main electrode of the second semiconductor switch is connected to a second potential different from the first potential;

wherein one end of the excitation winding is connected in common with the second main electrode of the first semiconductor switch and the first main electrode of the second semiconductor switch, and the other end of the excitation winding is connected to the second potential;

and wherein when a voltage pulse is applied to the excitation winding, the first semiconductor switch is closed and the second semiconductor switch is open in order to apply said voltage pulse to the excitation winding, and when no voltage is to be applied to excitation winding the first semiconductor switch is open and the second semiconductor switch is closed to short circuit the ends of the excitation winding.

49. A position detector according to claim 48, wherein the respective control terminals are connected in common to an input terminal for receiving a control signal.

50. A position detector according to claim 49, wherein the first semiconductor switch is a p-channel semiconductor switch and the second semiconductor switch is an n-channel semiconductor switch.

51. A position detector according to claim 50, wherein the first and second semiconductor switches are MOSFET switches.

52. A position detector according to claim 48, wherein the first semiconductor switch has a higher resistance when closed than the resistance of the second semiconductor switch when closed.

53. A position detector according to claim 48, wherein the first potential is a supply potential and the second potential is a reference potential.

54. A position detector according to claim 1 or 2, wherein said excitation circuit is operable to apply, to the excitation winding, spaced bursts of driving signal, each burst of driving signal having a fundamental frequency component defined by a sequence of voltage pulses, with the duration of voltage pulses within each burst being less than half the period of said fundamental frequency component.

55. A position detector according to claim 1 or 2, wherein said excitation circuit is operable to apply, to the excitation winding, a driving signal having a fundamental frequency component defined by a continuous sequence of voltage pulses and wherein the duration of the voltage pulses within the continuous sequence is less than half the period of said fundamental frequency component.

* * * * *